United States Patent
Zhang et al.

(10) Patent No.: US 11,582,000 B2
(45) Date of Patent: Feb. 14, 2023

(54) FRONT LOADED SOUNDING REFERENCE SIGNAL AND PHYSICAL RANDOM ACCESS CHANNEL SIGNAL

(71) Applicant: QUALCOMM Incorporated, San Diego, CA (US)

(72) Inventors: Xiaoxia Zhang, San Diego, CA (US); Srinivas Yerramalli, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/406,469

(22) Filed: May 8, 2019

(65) Prior Publication Data

US 2019/0349992 A1 Nov. 14, 2019

Related U.S. Application Data

(60) Provisional application No. 62/670,206, filed on May 11, 2018.

(51) Int. Cl.
*H04L 5/00* (2006.01)
*H04W 74/08* (2009.01)
(Continued)

(52) U.S. Cl.
CPC .......... *H04L 5/0048* (2013.01); *H04L 5/0051* (2013.01); *H04L 5/1469* (2013.01);
(Continued)

(58) Field of Classification Search
CPC ............. H04W 16/14; H04W 74/0808; H04W 74/0833; H04L 25/0226; H04L 27/2605;
(Continued)

(56) References Cited

U.S. PATENT DOCUMENTS

2017/0150523 A1* 5/2017 Patel .................... H04W 74/008
2017/0230972 A1* 8/2017 Wang .................... H04L 5/0048
(Continued)

FOREIGN PATENT DOCUMENTS

WO WO-2017025147 A1 * 2/2017 ........ H04W 74/0825
WO WO-2018075963 A1 * 4/2018 ........... H04L 5/0007

OTHER PUBLICATIONS

SRS design details Qualcomm 3GPP TSG RAN WG1 #84bis R1-163024 Apr. 11, 2016 (Year: 2016).*
(Continued)

*Primary Examiner* — Rina C Pancholi
(74) *Attorney, Agent, or Firm* — Holland & Hart LLP

(57) ABSTRACT

Methods, systems, and devices for wireless communications are described. A user equipment (UE) may identify a gap period following a downlink portion of a time division duplexing (TDD) frame. The UE may selectively perform, based at least in part on the gap period, a clear channel assessment (CCA) on a channel of a radio frequency spectrum band. The UE may transmit at least one of a sounding reference signal (SRS) or a physical random access channel (PRACH) preamble in a set of initial symbols of an uplink portion of the TDD frame following the gap period, wherein the SRS or PRACH preamble is frequency-domain multiplexed during the set of initial symbols with one or more of: a demodulation reference signal (DMRS), an uplink data transmission, an uplink control transmission, or a random access transmission.

30 Claims, 18 Drawing Sheets

(51) Int. Cl.
    *H04L 5/14*      (2006.01)
    *H04W 16/14*     (2009.01)
    *H04L 27/26*     (2006.01)
    *H04L 25/02*     (2006.01)

(52) U.S. Cl.
    CPC ...... *H04L 25/0226* (2013.01); *H04L 27/2605* (2013.01); *H04L 27/2613* (2013.01); *H04W 16/14* (2013.01); *H04W 74/0808* (2013.01); *H04W 74/0833* (2013.01); *H04L 5/0044* (2013.01)

(58) Field of Classification Search
    CPC ............... H04L 27/2613; H04L 5/1469; H04L 27/0006; H04L 27/2611; H04L 5/0044; H04L 5/0048; H04L 5/0051; H04L 5/0053; H04L 5/14
    See application file for complete search history.

(56) References Cited

U.S. PATENT DOCUMENTS

| | | | | |
|---|---|---|---|---|
| 2017/0366377 | A1* | 12/2017 | Papasakellariou | H04L 27/261 |
| 2019/0014598 | A1* | 1/2019 | Yoshimura | H04L 5/14 |
| 2019/0124678 | A1* | 4/2019 | Harada | H04W 72/042 |
| 2019/0141702 | A1* | 5/2019 | Li | H04W 74/006 |
| 2021/0127409 | A1* | 4/2021 | Park | H04W 72/0446 |

OTHER PUBLICATIONS

Ericsson: "On SRS Design for Enhanced LAA", 3GPP Draft; R1-160997, 3rd Generation Partnership Project (3GPP), Mobile Competence Centre, 650, Route Des Lucioles ; F-06921 Sophia-Antipolis Cedex, France, vol. RAN WG1, No. St Julian's, Malta; Feb. 15, 2016-Feb. 19, 2016, Feb. 14, 2016 (Feb. 14, 2016), pp. 1-5, XP051054301, Retrieved from the Internet: URL: http://www.3gpp.org/ftp/Meetings_3GPP_SYNC/RAN1/Docs/[retrieved on Feb. 14, 2016], Section 2.1.

International Search Report and Written Opinion—PCT/US2019/031599—ISA/EPO—dated Aug. 1, 2019.

ITL: "SRS Design in Rel-14 eLAA", 3GPP Draft; R1-163304, 3rd Generation Partnership Project (3GPP), Mobile Competence Centre, 650, Route Des Lucioles ; F-06921 Sophia-Antipolis Cedex, France, vol. RAN WG1, No. Busan, Korea; Apr. 11, 2016-Apr. 15, 2016, Apr. 2, 2016 (Apr. 2, 2016), 5 Pages, XP051080613, Retrieved from the Internet: URL: http://www.3gpp.org/ftp/tsg_ran/WG1_RL1/TSGR1_84b/Docs [retrieved on Apr. 2, 2016].

QUALCOMM Incorporated: "SRS Design Details", 3GPP Draft; R1-163024 SRS Design Details, 3rd Generation Partnership Project (3GPP), Mobile Competence Centre, 650, Route Des Lucioles ; F-06921 Sophia-Antipolis Cedex, France, vol. RAN WG1, No. Busan, Korea; Apr. 11, 2016-Apr. 15, 2016, Apr. 2, 2016 (Apr. 2, 2016), pp. 1-4, XP051080468, Retrieved from the Internet: URL: http://www.3gpp.org/ftp/tsg_ran/WG1_RL1/TSGR1_84b/Docs/ [retrieved on Apr. 2, 2016].

* cited by examiner

FRONT LOADED SOUNDING REFERENCE SIGNAL AND PHYSICAL RANDOM ACCESS CHANNEL SIGNAL

CROSS REFERENCE

The present Application for patent claims the benefit of U.S. Provisional Patent Application No. 62/670,206 by Zhang et al., entitled "FRONT LOADED SOUNDING REFERENCE SIGNAL AND PHYSICAL RANDOM ACCESS CHANNEL SIGNAL," filed May 11, 2018, assigned to the assignee hereof, and expressly incorporated herein.

BACKGROUND

The following relates generally to wireless communications, and more specifically to front loading a sounding reference signal (SRS) and physical random access channel (PRACH).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems may support a time division duplexing (TDD) based frame structure, such as a TDD fixed frame period. Generally, such a TDD based frame structure begins with a first device capturing the channel for a time period, e.g., a channel occupancy time (CoT), a transmission opportunity (TxOP), and the like, by performing a clear channel assessment (CCA) procedure on the channel. If the CCA procedure is successful, the first device controls the channel for the CoT, which may then be followed by an idle period. During the CoT, the first device may perform downlink transmissions to a second device and/or receive uplink transmissions from the second device. For example, the first device may perform a downlink transmission and provide a grant to the second device for resources for an uplink transmission. In some scenarios, gap periods between transmissions (e.g., between downlink and uplink transmissions, between successive uplink transmissions, and the like) during the CoT that exceed a threshold may require an additional CCA procedure to be performed by the second device before the uplink transmission can occur. The second device having to perform additional CCA procedures may delay such uplink transmissions, which increases latency and requires additional resources.

SUMMARY

The described techniques relate to improved methods, systems, devices, and apparatuses that support front loaded sounding reference signal (SRS) or physical random access channel (PRACH) preamble transmissions. References to an SRS transmission may refer to an SRS transmission, a SRS and a PRACH preamble transmission, and/or to a PRACH preamble transmission. Generally, the described techniques provide for front loading (e.g., during some of the first few symbols of an uplink portion) the SRS or PRACH preamble, where the SRS or PRACH preamble use frequency division multiplexing (FDM) with other reference signals (e.g., a demodulation reference signal (DMRS)), uplink data and/or control transmission(s), and/or other random access transmission(s). For example, a first device (such as a base station) may capture an unlicensed or shared channel by performing the CCA procedure, or some other listen-before-talk (LBT) procedure. In some aspects, the channel may be configured as a TDD frame, e.g., such as a TDD based fixed frame period. The first device may transmit a downlink transmission to a second device (e.g., a user equipment (UE)) during a downlink portion of the TDD frame. In some aspects, the downlink transmission may include data and/or control information and, in some examples, may include a grant of resources for the second device to use to perform an uplink transmission during an uplink portion of the TDD frame. The second device may identify a gap period that follows the downlink portion of the TDD frame, e.g., the period of time between when the downlink portion ends and the uplink portion begins. In some aspects, the second device may selectively perform a CCA procedure on the channel when the gap period exceeds a defined threshold. For example, some wireless communication systems may require the CCA procedure by the second device if the gap period exceeds the threshold.

However, aspects of the described techniques may enable the second device to avoid the CCA procedure by ensuring that the gap period does not exceed the threshold, or decreasing the instances that the gap period exceeds the threshold. For example, the described techniques may front-load the SRS or PRACH preamble during the early portion (e.g., during some of the first few symbols or set of initial symbols of the uplink portion of the TDD frame). Accordingly, the second device may transmit the SRS or PRACH preamble during the set of initial symbols and may FDM the SRS or PRACH preamble with a DMRS, uplink data or control transmission(s), and/or other random access transmission(s). Frontloading the SRS or PRACH preamble with the other transmissions may provide a mechanism for the second device (or other device) to communicate early during the uplink portion of the TDD frame, and therefore minimize the length of the gap period and avoid having to perform additional CCA procedure(s).

A method of wireless communication at a UE is described. The method may include identifying a gap period following a downlink portion of a TDD frame, selectively performing, based on the gap period, a CCA on a channel of a radio frequency spectrum band, and transmitting at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission.

An apparatus for wireless communication at a UE is described. The apparatus may include a processor, memory coupled with the processor, and instructions stored in the memory. The instructions may be executable by the processor to cause the apparatus to identify a gap period following a downlink portion of a TDD frame, selectively perform, based on the gap period, a CCA on a channel of a radio frequency spectrum band, and transmit at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission.

Another apparatus for wireless communication at a UE is described. The apparatus may include means for identifying a gap period following a downlink portion of a TDD frame, selectively performing, based on the gap period, a CCA on a channel of a radio frequency spectrum band, and transmitting at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission.

A non-transitory computer-readable medium storing code for wireless communication at a UE is described. The code may include instructions executable by a processor to identify a gap period following a downlink portion of a TDD frame, selectively perform, based on the gap period, a CCA on a channel of a radio frequency spectrum band, and transmit at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission.

Some examples of the method, apparatuses, and non-transitory computer-readable medium described herein may further include operations, features, means, or instructions for identifying a first comb of a resource block, where the SRS or PRACH preamble may be transmitted on the first comb of the resource block during the set of initial symbols.

In some examples of the method, apparatuses, and non-transitory computer-readable medium described herein, the DMRS, or the uplink data transmission, or the uplink control transmission, or the random access transmission may be transmitted on a second comb of the resource block.

Some examples of the method, apparatuses, and non-transitory computer-readable medium described herein may further include operations, features, means, or instructions for transmitting the DMRS from a first set of antenna ports during a first subset of the set of initial symbols.

Some examples of the method, apparatuses, and non-transitory computer-readable medium described herein may further include operations, features, means, or instructions for transmitting the DMRS from a second set of antenna ports during a second subset of the set of initial symbols.

Some examples of the method, apparatuses, and non-transitory computer-readable medium described herein may further include operations, features, means, or instructions for transmitting the SRS or PRACH preamble frequency-domain multiplexed with the uplink data transmission during a first subset of the set of initial symbols.

Some examples of the method, apparatuses, and non-transitory computer-readable medium described herein may further include operations, features, means, or instructions for transmitting the SRS or PRACH preamble frequency-domain multiplexed with the DMRS from a set of antenna ports during a second subset of the set of initial symbols.

In some examples of the method, apparatuses, and non-transitory computer-readable medium described herein, the SRS or PRACH preamble and the DMRS may be transmitted on different combs of a resource block.

Some examples of the method, apparatuses, and non-transitory computer-readable medium described herein may further include operations, features, means, or instructions for transmitting the SRS or PRACH preamble on a first interlace of a channel bandwidth and the DMRS, or uplink data transmission, or uplink control transmission, or random access transmission on a second interlace of the channel bandwidth.

Some examples of the method, apparatuses, and non-transitory computer-readable medium described herein may further include operations, features, means, or instructions for transmitting the uplink data transmission over a physical uplink shared channel (PUSCH).

Some examples of the method, apparatuses, and non-transitory computer-readable medium described herein may further include operations, features, means, or instructions for transmitting an additional uplink data transmission over a PUSCH during one or more symbols occurring after the set of initial symbols.

In some examples of the method, apparatuses, and non-transitory computer-readable medium described herein, selectively performing the CCA on the channel of the radio frequency spectrum band based on the gap period may include operations, features, means, or instructions for performing the CCA procedure when a duration of the gap period exceeds a threshold.

In some examples of the method, apparatuses, and non-transitory computer-readable medium described herein, selectively performing the CCA on the channel of the radio frequency spectrum band based on the gap period may include operations, features, means, or instructions for transmitting the SRS or PRACH preamble without performing the CCA procedure when a duration of the gap period may be less than a threshold.

In some examples of the method, apparatuses, and non-transitory computer-readable medium described herein, the set of initial symbols include one or more symbols immediately following the gap period.

A method of wireless communication at a base station is described. The method may include performing a CCA on a channel of a radio frequency spectrum band prior to a downlink portion of a TDD frame, performing, based on a success of the CCA, a downlink transmission during the downlink portion of the TDD frame, and receiving, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission.

An apparatus for wireless communication at a base station is described. The apparatus may include a processor, memory coupled with the processor, and instructions stored in the memory. The instructions may be executable by the processor to cause the apparatus to perform a CCA on a channel of a radio frequency spectrum band prior to a downlink portion of a TDD frame, perform, based on a success of the CCA, a downlink transmission during the downlink portion of the TDD frame, and receive, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission.

Another apparatus for wireless communication at a base station is described. The apparatus may include means for performing a CCA on a channel of a radio frequency spectrum band prior to a downlink portion of a TDD frame, performing, based on a success of the CCA, a downlink transmission during the downlink portion of the TDD frame, and receiving, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission.

A non-transitory computer-readable medium storing code for wireless communication at a base station is described. The code may include instructions executable by a processor to perform a CCA on a channel of a radio frequency spectrum band prior to a downlink portion of a TDD frame, perform, based on a success of the CCA, a downlink transmission during the downlink portion of the TDD frame, and receive, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission.

Some examples of the method, apparatuses, and non-transitory computer-readable medium described herein may further include operations, features, means, or instructions for identifying a first comb of a resource block, where the SRS or PRACH preamble may be received on the first comb of the resource block during the set of initial symbols.

Some examples of the method, apparatuses, and non-transitory computer-readable medium described herein may further include operations, features, means, or instructions for identifying a second comb of the resource block and receiving one or more of: the DMRS, or the uplink data transmission, or the uplink control transmission, or the random access transmission on the second comb of the resource block.

Some examples of the method, apparatuses, and non-transitory computer-readable medium described herein may further include operations, features, means, or instructions for receiving the DMRS from a first set of antenna ports during a first subset of the set of initial symbols.

Some examples of the method, apparatuses, and non-transitory computer-readable medium described herein may further include operations, features, means, or instructions for receiving the DMRS from a second set of antenna ports during a second subset of the set of initial symbols.

Some examples of the method, apparatuses, and non-transitory computer-readable medium described herein may further include operations, features, means, or instructions for receiving the SRS or PRACH preamble frequency-domain multiplexed with the uplink data transmission during a first subset of the set of initial symbols.

Some examples of the method, apparatuses, and non-transitory computer-readable medium described herein may further include operations, features, means, or instructions for receiving the SRS or PRACH preamble frequency-domain multiplexed with the DMRS from a set of antenna ports during a second subset of the set of initial symbols.

In some examples of the method, apparatuses, and non-transitory computer-readable medium described herein, the SRS or PRACH preamble and the DMRS may be received on a different comb of a resource block.

Some examples of the method, apparatuses, and non-transitory computer-readable medium described herein may further include operations, features, means, or instructions for receiving the SRS or PRACH preamble on a first interlace of a channel bandwidth and the DMRS, or uplink data transmission, or uplink control transmission, or random access transmission on a second interlace of the channel bandwidth.

Some examples of the method, apparatuses, and non-transitory computer-readable medium described herein may further include operations, features, means, or instructions for receiving the uplink data transmission over a PUSCH.

Some examples of the method, apparatuses, and non-transitory computer-readable medium described herein may further include operations, features, means, or instructions for receiving an additional uplink data transmission over a PUSCH during one or more symbols occurring after the set of initial symbols.

Some examples of the method, apparatuses, and non-transitory computer-readable medium described herein may further include operations, features, means, or instructions for receiving the SRS or PRACH preamble from a first device and the DMRS, or uplink data transmission, or uplink control transmission, or random access transmission from a second device, the second device being different from the first device.

Some examples of the method, apparatuses, and non-transitory computer-readable medium described herein may further include operations, features, means, or instructions for receiving the SRS or PRACH preamble and at least one of the DMRS, or uplink data transmission, or uplink control transmission, or random access transmission from a same device.

In some examples of the method, apparatuses, and non-transitory computer-readable medium described herein, the set of initial symbols include one or more symbols immediately following the gap period.

DETAILED DESCRIPTION

Figure 1:
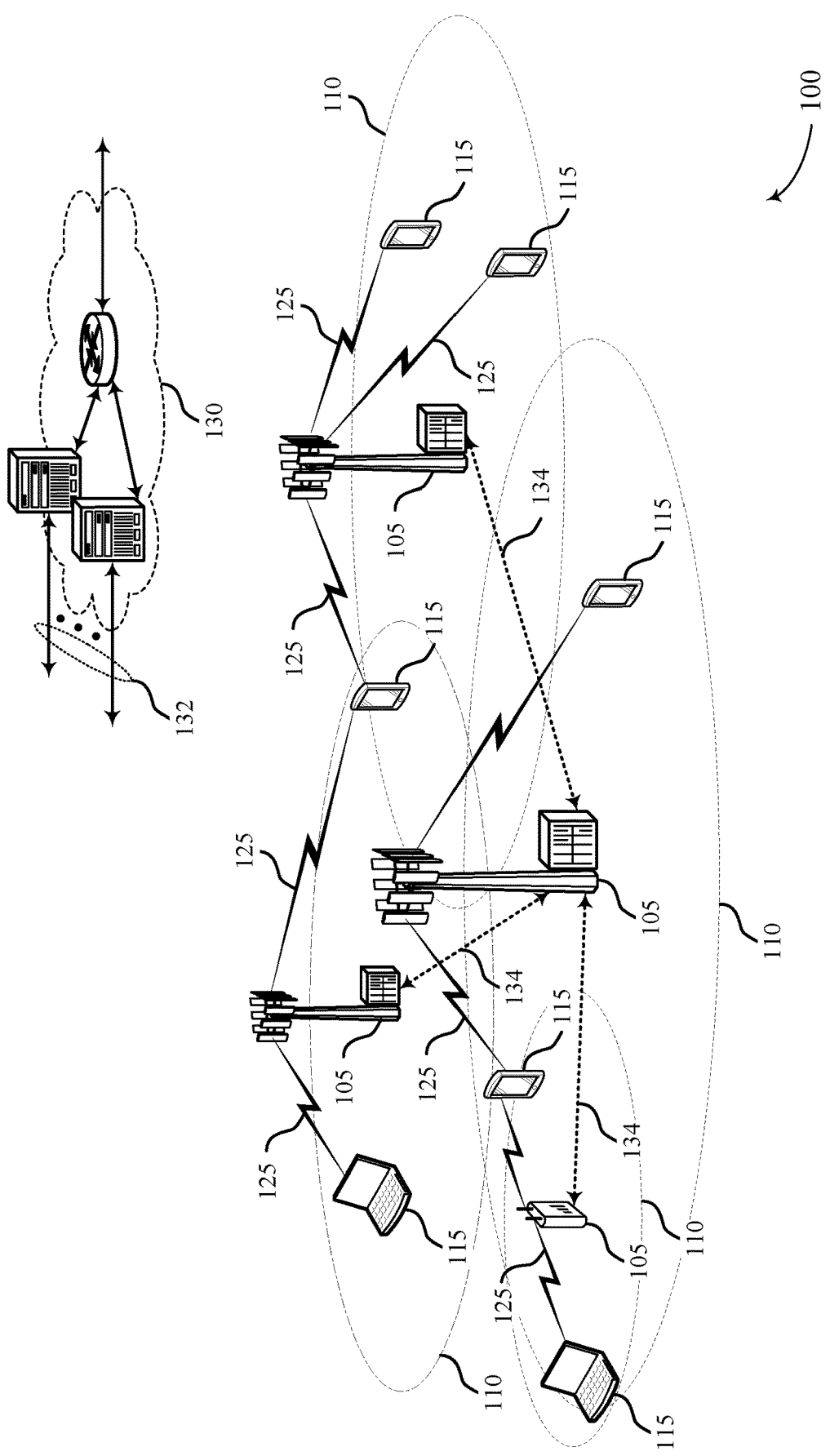
FIG. 1 illustrates an example of a system for wireless communications that supports front loaded sounding reference signal (SRS) and physical random access channel (PRACH) preamble in accordance with aspects of the present disclosure.

Certain wireless communication systems may be configured with time division duplexing (TDD) based frame structure over a shared or unlicensed radio frequency spectrum band. For example, a first device (such as a base station) may capture the channel in the shared or unlicensed band by performing a clear channel assessment (CCA) procedure on the channel. Once captured, the first device may perform downlink and/or uplink communications on the channel for a time period, e.g., during corresponding downlink portions and uplink portions of the TDD frame. In some cases, the transmissions during the TDD frame may not require an additional CCA procedure unless there is a gap period that extends beyond a defined time period. For example, between downlink and uplink, between uplink and downlink transmissions, between successive uplink or downlink transmissions, and the like, the corresponding devices must perform an additional CCA procedure during the TDD frame if the gap period exceeds the defined time period or threshold. This increases latency and utilizes unnecessary resources.

Aspects of the disclosure are initially described in the context of a wireless communications system. Generally, aspects of the disclosure provide a mechanism where a second device (e.g., a user equipment (UE)) can avoid having to perform additional CCA procedure(s) by minimizing the gap period between downlink and uplink portions of the TDD frame. For example, a first device (e.g., a base station) may capture the channel by performing a CCA procedure on the channel. In some aspects, the channel may be a shared or unlicensed radio frequency spectrum band. The first device may capture the channel for a time period, e.g., for a channel occupancy time (CoT), a transmission opportunity (TxOP), and the like. The first device may perform downlink transmission(s) on the channel during the corresponding downlink portion(s) of the TDD frame. In some aspects, the downlink transmissions may include a grant of resources for the second device to use for uplink transmissions on the channel. In some aspects, the downlink transmissions may simply provide an indication of a time in which the second device can use the channel for uplink transmissions (e.g., may provide an indication of the uplink portion of the TDD frame).

In some aspects, the second device may identify a gap period that follows the downlink portion of the TDD frame. For example, the gap period may include the time between when the downlink portion ends and when the uplink portion begins. In some aspects, the second device may selectively perform a CCA procedure on the channel based on the gap period. For example, the second device may perform the CCA procedure when the gap period exceeds a defined threshold (e.g., is longer than a defined time period). However, the second device may skip the CCA procedure on the channel when the gap period does not exceed the defined threshold. In some aspects, this may include the second device transmitting an SRS or PRACH preamble in a set of initial symbols of the uplink portion of the TDD frame. For example, the gap period may include the first, or the first and second symbols of the TDD frame and the SRS or PRACH preamble may be transmitted in the second, or the second and third, and so on, symbols of the TDD frame. In some aspects, frontloading the SRS or PRACH preamble during the set of initial symbols of the uplink portion of the TDD frame may minimize a duration of the gap period and therefore reduce the occasions that the CCA procedure needs to be performed. In some aspects, the second device may also FDM the SRS or PRACH preamble with other transmissions (either from the second device or from other devices operating on the channel). For example, the second device may FDM the SRS or PRACH preamble with a demodulation reference symbol (DMRS), uplink control or data transmission(s), or other random access transmission(s). In some aspects, the FDM may be on a per-tone basis, on a per-comb basis, on a per-interlace basis, and the like.

Aspects of the disclosure are further illustrated by and described with reference to apparatus diagrams, system diagrams, and flowcharts that relate to front loaded SRS.

FIG. 1 illustrates an example of a wireless communications system 100 that supports front loaded SRS and PRACH in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a New Radio (NR) network, or a NR shared spectrum (NR-SS) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a first device (e.g., a base station 105) and a second device (e.g., a UE 115), where the first device is equipped with multiple antennas and the second devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the first device via different antennas or different combinations of antennas. Likewise, the multiple signals may be received by the second device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same second device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a first device or a second device (e.g., a base station 105 or a UE 115) to shape or steer an antenna beam (e.g., a transmit beam or receive beam) along a spatial path between the first device and the second device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a first device or a second device applying amplitude and phase offsets to signals carried via each of the antenna elements associated with the device. The adjustments associated with each of the antenna elements may be defined by a beamforming weight set associated with a particular orientation (e.g., with respect to the antenna array of the first device or second device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a second device, such as a UE 115) a beam direction for subsequent transmission and/or reception by the base station 105. Some signals, such as data signals associated with a particular second device, may be transmitted by a base station 105 in a single beam direction (e.g., a direction associated with the second device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a second device).

A second device (e.g., a UE 115, which may be an example of a mmW second device) may try multiple receive beams when receiving various signals from the base station 105, such as synchronization signals, reference signals, beam selection signals, or other control signals. For example, a second device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a second device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 (e.g., a second device) may identify a gap period following a downlink portion of a TDD frame. The UE 115 may selectively perform, based at least in part on the gap period, a CCA on a channel of a radio frequency spectrum band. The UE 115 may transmit at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission.

A base station 105 (e.g., a first device) may perform a CCA on a channel of a radio frequency spectrum band prior to a downlink portion of a TDD frame. The base station 105 may perform, based at least in part on a success of the CCA, a downlink transmission during the downlink portion of the TDD frame. The base station 105 may receive, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission.

Figure 2:
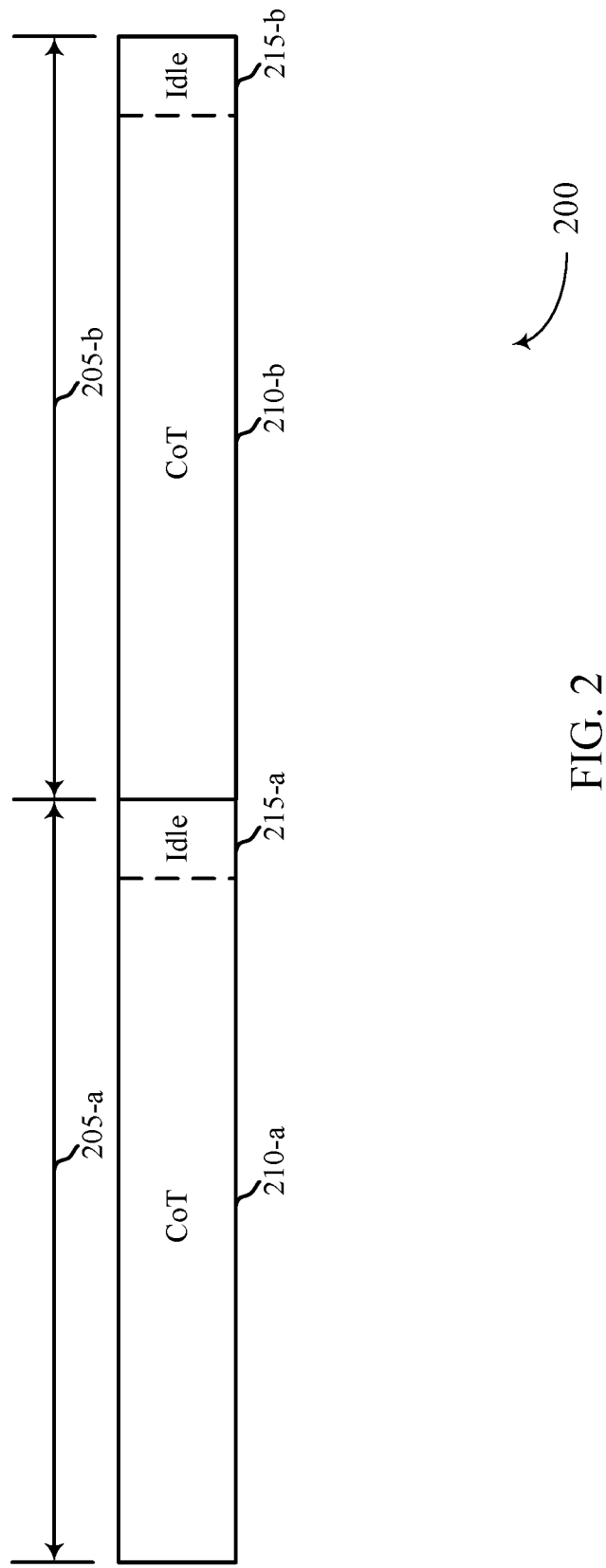
FIG. 2 illustrates an example of a time division duplexing (TDD) frame configuration that supports front loaded SRS and PRACH in accordance with aspects of the present disclosure.

FIG. 2 illustrates an example of a TDD frame configuration 200 that supports front loaded SRS and PRACH in accordance with aspects of the present disclosure. In some examples, TDD frame configuration 200 may implement aspects of wireless communication system 100. Aspects of TDD frame configuration 200 may be implement a by a base station and/or a UE, which may be examples of the corresponding devices described herein.

Generally, TDD frame configuration 200 includes a TDD frame 205, with two TDD frames 205 being shown by way of examples and illustrated as TDD frame 205-a and TDD frame 205-b. In some aspects, TDD frame 205 may be a TxOP, a mini-slot, a partial slot, a slot, a subframe, and the like. In some aspects, TDD frame 205 may include one or more resource blocks. Each TDD frame 205 may include a communication portion 210 (illustrated as CoT) followed by an idle portion 215. Thus, TDD frame 205-a includes a communication portion 210-a and an idle portion 215-a and TDD frame 205-b includes a communication portion 210-b and an idle portion 215-b. In some aspects, the communication portion 210 may be associated with a wireless device(s) performing uplink communications and/or downlink communications of control and/or data information. In some aspects, the idle portion 215 may be associated with a period in which the wireless device(s) refrain from communicating on the channel. In some aspects, TDD frame 205 may be used for communications on one or more channels in a shared or unlicensed radio frequency spectrum band, may have a corresponding bandwidth, and the like.

In some aspects, TDD frame configuration 200 may be an example of a fixed frame period in a frame based equipment (FBE) network. As one example, TDD frame 205 may support industrial IoT communications in a single or a multiple operator environment.

In some aspects, a first device may capture a TDD frame 205 by performing a CCA procedure on the channel. For example, the first device may monitor the channel for a period of time to detect signals and/or traffic on the channel and, if none is detected, determine that the CCA procedure is successful and transmit a signal to reserve the channel for the communication portion 210. Generally, the CCA procedure may be performed prior to communications being performed on the channel, e.g., prior to a downlink portion or an uplink portion occurring during the corresponding communication portion 210.

In some aspects, the first device may use the entire communication portion 210 to perform downlink communications. In other aspects, the first device may have one or more downlink portions and one or more uplink portions during the communication portion 210. In some aspects, the first device may transmit a signal to a second device that carries or otherwise conveys an indication of a grant for the uplink communications on the second device. For example, the signal may include a grant of time/frequency resources that the second device is to use to perform the uplink communications. As another example, the signal may simply include an indication of a time when the second device is to begin performing the uplink communications, e.g., an indication of time associated with the uplink portion of the TDD frame 205. Accordingly, the first device generally controls the channel during the communication portion 210 and can use the channel for uplink and/or downlink communications with the second device.

In some aspects, the first device may have multiple transmissions within the communication portion 210 (e.g., during the CoT) without performing additional CCA procedures, provided that a gap period between such transmissions does not exceed a defined threshold. Correspondingly, the second device may proceed with uplink transmissions without performing a CCA procedure, provided that a gap period between such transmissions also does not exceed the defined threshold, e.g., the uplink communications must begin within a defined period since the last downlink transmission by the first device. Aspects of the described techniques provide a mechanism that reduces the number of occasions that the second device must perform additional CCA procedure(s) by front loading and SRS or PRACH preamble transmission and also FDM the SRS or PRACH preamble with DMRS, uplink control or data transmission(s), and/or other random access transmission(s). Generally, the SRS or PRACH preamble may be FDM with DMRS, uplink control or data transmission(s), and/or the other random access transmission(s) from the second device and/or from other wireless devices. In some aspects, each wireless device utilizing TDD frame 205 may be preconfigured to implement such techniques and/or may be configured by the network to implement or initiate such techniques as warranted.

Therefore, the second device may identify the gap period following the downlink portion of the communication portion 210 of the TDD frame 205. In some aspects, this may include the second device determining whether the gap period has exceeded the threshold or has not exceeded the threshold. If the gap period has not exceeded the threshold, the second device may proceed with performing uplink transmissions without performing a CCA procedure on the channel. If the gap period has exceeded the threshold, the second device may selectively perform the CCA procedure on the channel.

The second device may transmit an SRS or PRACH preamble during a set of initial symbols of the uplink portion of the TDD frame 205 the follows the gap period. In some aspects, the SRS or PRACH preamble may be FDM during the set of initial symbols with a DMRS, an uplink control or data transmission, and/or a random access transmission. In some aspects, the SRS or PRACH preamble may be FDM on a per-tone basis (e.g., using different combs for the SRS or PRACH preamble and the DMRS/uplink control and/or data, etc.) and/or on a per-interlace basis (e.g., using different interlaces for the SRS or PRACH preamble and the DMR/uplink control and/or data, etc.). In some aspects, front loading the SRS or PRACH preamble in accordance with the described techniques provides a mechanism where the second device can initiate an uplink transmission (e.g., the SRS or PRACH preamble) during the initial set of the symbols of the uplink portion of TDD frame 205 to minimize the gap period between the downlink portion and the uplink portion, and therefore reduce the likelihood of having to perform an additional CCA procedure(s).

Thus, the second device may transmit the SRS (or PRACH preamble) that can be multiplexed with a physical uplink shared channel (PUSCH) UE (e.g., a different device performing uplink control or data transmissions) in the frequency domain instead of TDM. This may reduce the sensing gap (e.g., the gap period) between SRS and PUSCH and avoid an additional CCA procedure.

In some aspects this may include DMRS and SRS being transmitted on different combs. For example, DMRS for PUSCH may be front loaded. The SRS is also front loaded and can be multiplexed on a different comb than the DMRS.

In some aspects when additional SRS symbols are needed, the SRS can be frequency multiplexed with PUSCH data. The PUSCH data may rate match around the comb occupied by SRS resources.

In some aspects, this may include SRS being front loaded and FDM with data on a different comb. For example, DMRS for PUSCH may be TDM with SRS (e.g., to avoid SRS and DMRS on the same symbol).

In some aspects, this may include an interlaced SRS design. For example, the SRS may be transmitted on a given comb on a given interlace (e.g., SRS and PUSCH/physical uplink control channel (PUCCH)/PRACH are on different interlaces).

In some aspects, the described techniques can be utilized with SRS and/or with PRACH transmissions. For example, PRACH may be transmitted at the beginning of the uplink portion, e.g., front loaded PRACH. In some aspects for a given PRACH format, defined start symbol locations may be supported. PRACH may be FDM with other channels by transmitting on different interlaces, on different combs, and/or on different resource elements. When PRACH and other channel are multiplexed on different resource elements, comb based PRACH design can be utilized.

Figure 3:
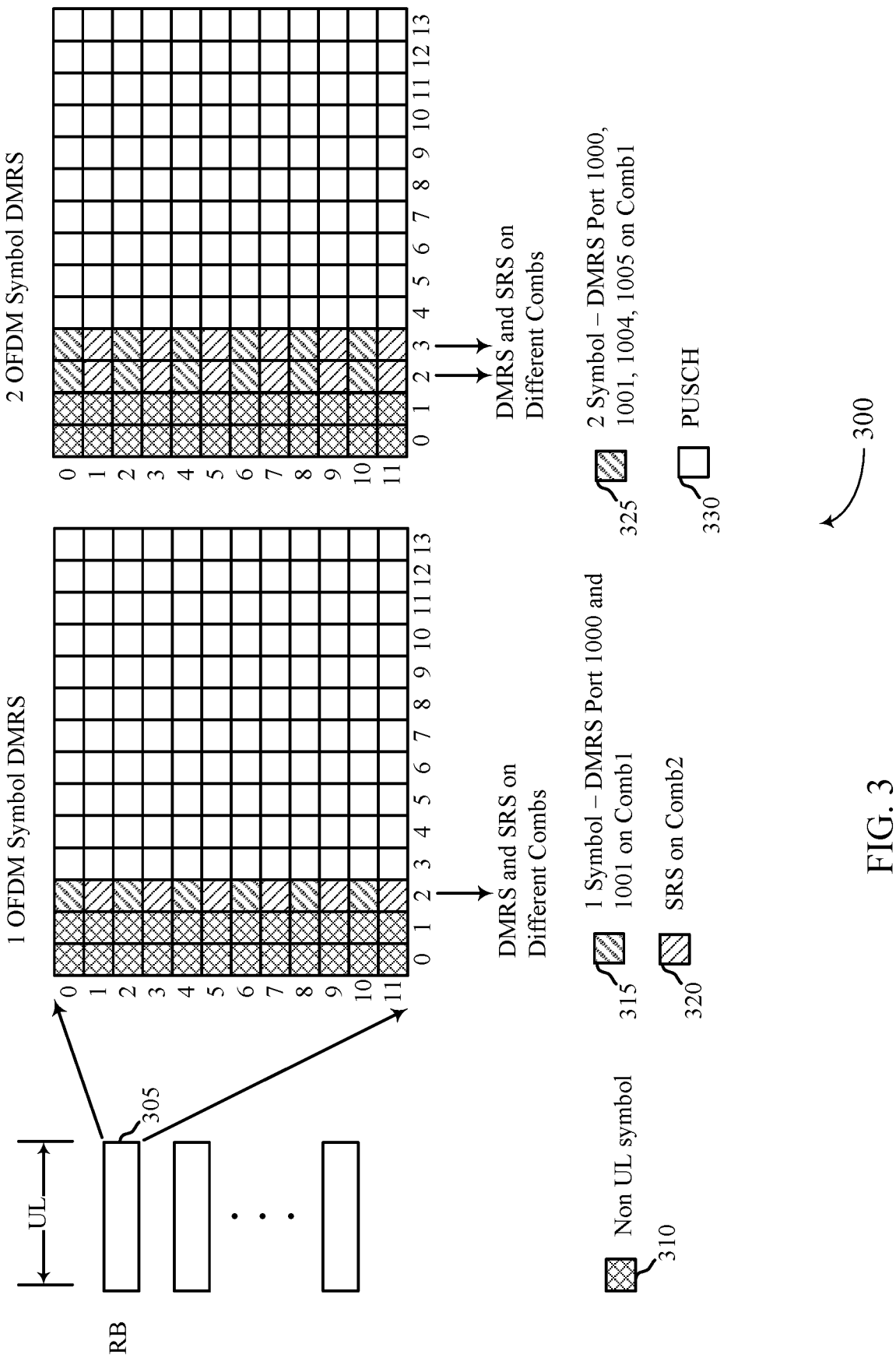
FIG. 3 illustrates an example of a resource block (RB) configuration that supports front loaded SRS and PRACH in accordance with aspects of the present disclosure.

FIG. 3 illustrates an example of a resource block (RB) configuration 300 that supports front loaded SRS and PRACH in accordance with aspects of the present disclosure. In some examples, RB configuration 300 may implement aspects of wireless communication system 100 and/or TDD frame configuration 200. Aspects of RB configuration 300 may be implemented by a UE and/or a base station, which may be examples of corresponding devices described herein. It is to be understood that references to SRS being transmitted in accordance with RB configuration 300 may also refer to a PRACH preamble transmissions.

Generally, RB configuration 300 illustrates two example configurations for a RB 305. Generally, the RB 305 may be an initial RB that occurs during an uplink portion of the TDD frame. For example, a first device (e.g., a base station) may perform a CCA procedure on the channel. If the CCA procedure is successful, the first device may capture the channel for some or all of the duration of the TDD frame and perform one or more downlink transmissions during corresponding downlink portions of the TDD frame. In some aspects, first device may also use the channel for uplink transmissions from a second device, e.g., the first device may provide a grant or other indication of time and/or frequency resources of the TDD frame for the second device to use for uplink communications. In some aspects, the uplink portion of the TDD frame may span one or more RBs 305.

In some aspects, each of the two illustrated RB 305 configurations includes a plurality of tones (with 12 tones being shown by way of example only and labeled as 0-11 on the vertical axis) and a plurality of symbols (with 14 symbols being shown by way of example only and labeled as 0-13 on the horizontal axis). Other RB 305 configurations may also be used having more or fewer tones with more or fewer symbols.

The first example RB 305 configuration includes 1 OFDM symbol DMRS transmissions. Generally, the first example RB 305 configuration includes an SRS being multiplexed in the frequency domain with a DMRS from four antenna ports. For example, the first example RB 305 configuration may include symbols 0 and 1 being used as non-uplink symbols 310, e.g., symbols 0 and 1 may be a part of the downlink portion of the TDD frame and/or may be a part of the gap period between the downlink portion and the uplink portion. During symbol 2, SRS 320 may be multiplexed in the frequency domain with DMRS 315. For example, DMRS 315 may be transmitted on tones 0, 2, 4, 6, 8, and 10, with SRS being transmitted on tones 1, 3, 5, 7, 9, and 11 of symbol 2. In some aspects, the DMRS 315 may be transmitted from one or more antenna ports, with ports 1000 and 1001 being illustrated in the first example RB 305 configuration. In some aspects, the FDM techniques may correspond to different combs, with the DMRS 315 being transmitted on comb 1 (e.g., on a first comb consisting of tones 0, 2, 4, 6, 8, and 10) and the SRS being transmitted on comb 2 (e.g., on a second comb consisting of tones 1, 3, 5, 7, 9, and 11). The remaining resources of the first example RB 305 configuration may be used for PUSCH 330 transmissions, e.g., one or more of tones 0-11 and/or symbols 3-13 may be used for PUSCH 330 transmissions.

The second example RB 305 configuration includes 2 OFDM symbol DMRS transmissions. Generally, the second example RB 305 configuration includes an SRS being multiplexed in the frequency domain with a DMRS from four antenna ports during two symbols. For example, the second example RB 305 configuration may include symbols 0 and 1 being non-uplink symbols 310, e.g., symbols 0 and 1 may be a part of the downlink portion of the TDD frame and/or may be a part of the gap period between the downlink portion and the uplink portion. During symbols 2 and 3, SRS 320 may be multiplexed in the frequency domain with DMRS 325. For example, DMRS 325 may be transmitted on tones 0, 2, 4, 6, 8, and 10, with SRS being transmitted on tones 1, 3, 5, 7, 9, and 11 of symbols 2 and 3. In some aspects, the DMRS 325 may be transmitted from one or more antenna ports, with four ports 1000, 1001, 1004, and 1005 being illustrated in the second example RB 305 configuration. In some aspects, the FDM techniques may correspond to different combs, with the DMRS 325 being transmitted on comb 1 (e.g., on a first comb consisting of tones 0, 2, 4, 6, 8, and 10) and the SRS 320 being transmitted on comb 2 (e.g., on a second comb consisting of tones 1, 3, 5, 7, 9, and 11) of symbols 2 and 3. The remaining resources of the second example RB 305 configuration may be used for PUSCH 330 transmissions, e.g., one or more of tones 0-11 and/or symbols 4-13 may be used for PUSCH 330 transmissions.

Figure 4:
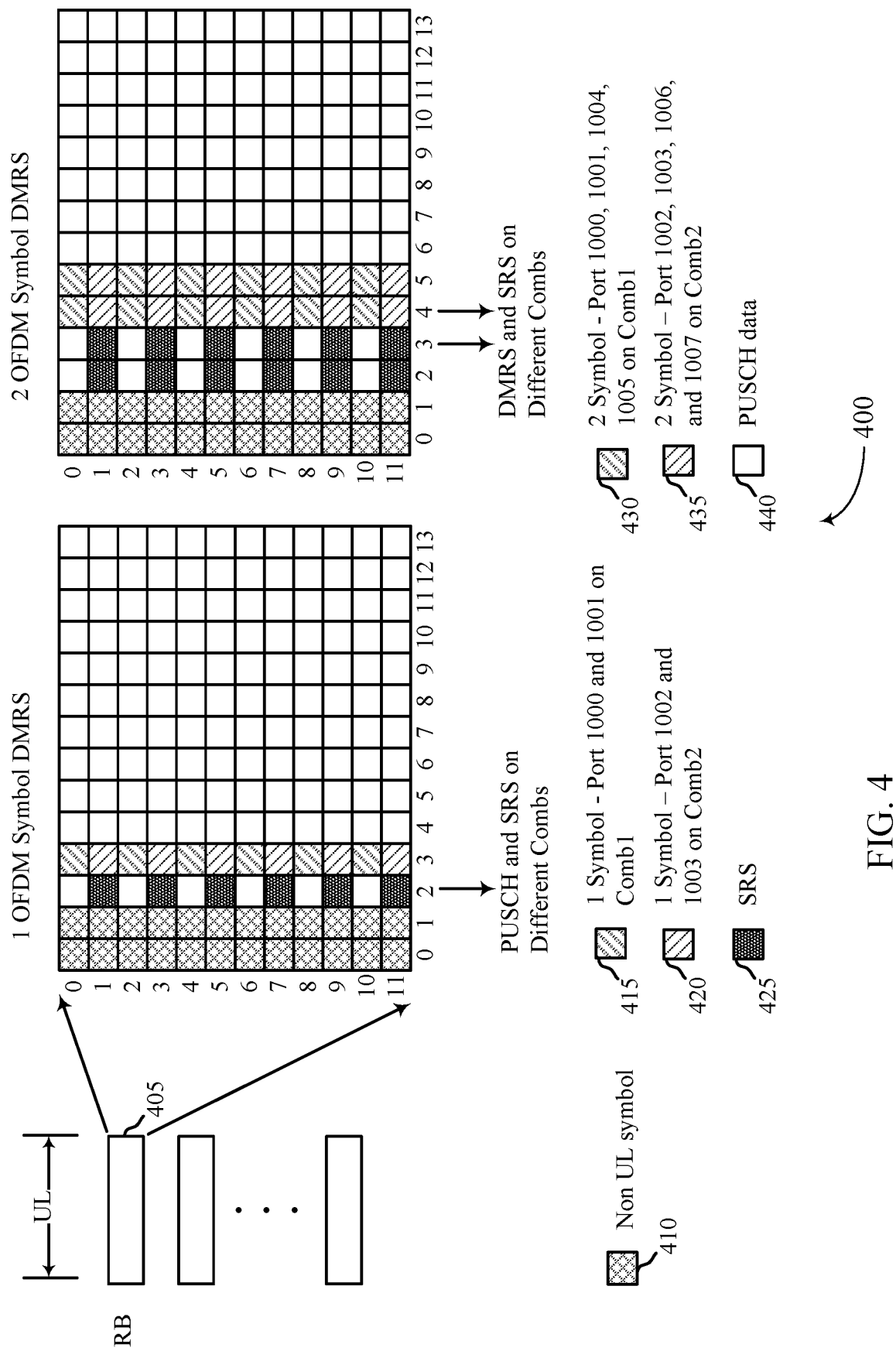
FIG. 4 illustrates an example of a RB configuration that supports front loaded SRS and PRACH in accordance with aspects of the present disclosure.

FIG. 4 illustrates an example of a RB configuration 400 that supports front loaded SRS and PRACH in accordance with aspects of the present disclosure. In some examples, RB configuration 400 may implement aspects of wireless communication system 100 and/or TDD frame configuration 200. Aspects of RB configuration 400 may be implemented by a UE and/or a base station, which may be examples of the corresponding devices described herein. It is to be understood that references to SRS being transmitted in accordance with RB configuration 400 may also refer to a PRACH preamble transmissions.

Generally, RB configuration 400 illustrates two example configurations for a RB 405. Generally, the RB 405 may be an initial RB that occurs during an uplink portion of the TDD frame. For example, a first device (e.g., a base station) may perform a CCA procedure on the channel. If the CCA procedure is successful, the first device may capture the channel for the TDD frame and perform one or more downlink transmissions during corresponding downlink portions of the TDD frame. In some aspects, first device may also use the channel for uplink transmissions from a second device, e.g., the first device may provide a grant or other indication of time and/or frequency resources of the TDD frame for the second device to use for uplink communications. In some aspects, the uplink portion of the TDD frame may span one or more RBs 405.

In some aspects, each of the two illustrated RBs 405 configurations includes a plurality of tones (with 12 tones being shown by way of example only and labeled as 0-11 on the vertical axis) and a plurality of symbols (with 14 symbols being shown by way of example only and labeled as 0-13 on the horizontal axis). Other RB 405 configurations may also be used having more or fewer tones with more or fewer symbols.

The first example RB 405 configuration includes 1 OFDM symbol DMRS transmissions. Generally, the first example RB 405 configuration includes an SRS being multiplexed in the frequency domain with an uplink control or data transmissions. For example, the first example RB 405 configuration may include symbols 0 and 1 being used as non-uplink symbols 410, e.g., symbols 0 and 1 may be a part of the downlink portion of the TDD frame and/or may be a part of the gap period between the downlink portion and the uplink portion. During symbol 2, SRS 425 may be multiplexed in the frequency domain with PUSCH data 440. For example, PUSCH data 440 may be transmitted on tones 0, 2, 4, 6, 8, and 10, with SRS 425 being transmitted on tones 1, 3, 5, 7, 9, and 11 of symbol 2. During symbol 3, DMRS 415 may be multiplexed in the frequency domain with DMRS 420. For example, DMRS 415 may be transmitted on tones 0, 2, 4, 6, 8, and 10, with DMRS 420 being transmitted on tones 1, 3, 5, 7, 9, and 11 of symbol 3. In some aspects, the DMRS 415 and DMRS 420 may be transmitted from one or more antenna ports, with ports 1000 and 1001 being illustrated for DMRS 415 and with ports 1002 and 1003 being illustrated for DMRS 420 in the first example RB 405 configuration. In some aspects, the FDM techniques may correspond to different combs, with the SRS 425 being transmitted on comb 1 (e.g., on a first comb consisting of tones 0, 2, 4, 6, 8, and 10) and the PUSCH data 440 being transmitted on comb 2 (e.g., on a second comb consisting of tones 1, 3, 5, 7, 9, and 11). Similarly, DMRS 415 being transmitted on comb 1 and DMRS 420 being transmitted on comb 2. The remaining resources of the first example RB 405 configuration may be used for PUSCH 440 transmissions, e.g., one or more of tones 0-11 and/or symbols 4-13 may be used for additional PUSCH 440 transmissions.

The second example RB 405 configuration includes 2 OFDM symbol DMRS transmissions. Generally, the second example RB 405 configuration includes an SRS being multiplexed in the frequency domain with an uplink control or data transmissions. For example, the second example RB 405 configuration may include symbols 0 and 1 being used as non-uplink symbols 410, e.g., symbols 0 and 1 may be a part of the downlink portion of the TDD frame and/or may be a part of the gap period between the downlink portion and the uplink portion. During symbols 2 and 3, SRS 425 may be multiplexed in the frequency domain with PUSCH data 440. For example, PUSCH data 440 may be transmitted on tones 0, 2, 4, 6, 8, and 10, with SRS 425 being transmitted on tones 1, 3, 5, 7, 9, and 11 of symbols 2 and 3. During symbols 4 and 5, DMRS 430 may be multiplexed in the frequency domain with DMRS 435. For example, DMRS 430 may be transmitted on tones 0, 2, 4, 6, 8, and 10, with DMRS 435 being transmitted on tones 1, 3, 5, 7, 9, and 11 of symbols 4 and 5. In some aspects, the DMRS 430 and DMRS 435 may be transmitted from one or more antenna ports, with ports 1000, 1001, 1004, and 1005 being illustrated for DMRS 430 and with ports 1002, 1003, 1006, and 1007 being illustrated for DMRS 435 in the second example RB 405 configuration. In some aspects, the FDM techniques may correspond to different combs, with the SRS 425 being transmitted on comb 1 (e.g., on tones 0, 2, 4, 6, 8, and 10) and the PUSCH data 440 being transmitted on comb 2 (e.g., on tones 1, 3, 5, 7, 9, and 11). Similarly, DMRS 430 being transmitted on comb 1 and DMRS 435 being transmitted on comb 2. The remaining resources of the second example RB 405 configuration may be used for PUSCH 440 transmissions, e.g., one or more of tones 0-11 and/or symbols 6-13 may be used for additional PUSCH 440 transmissions.

Figure 5:
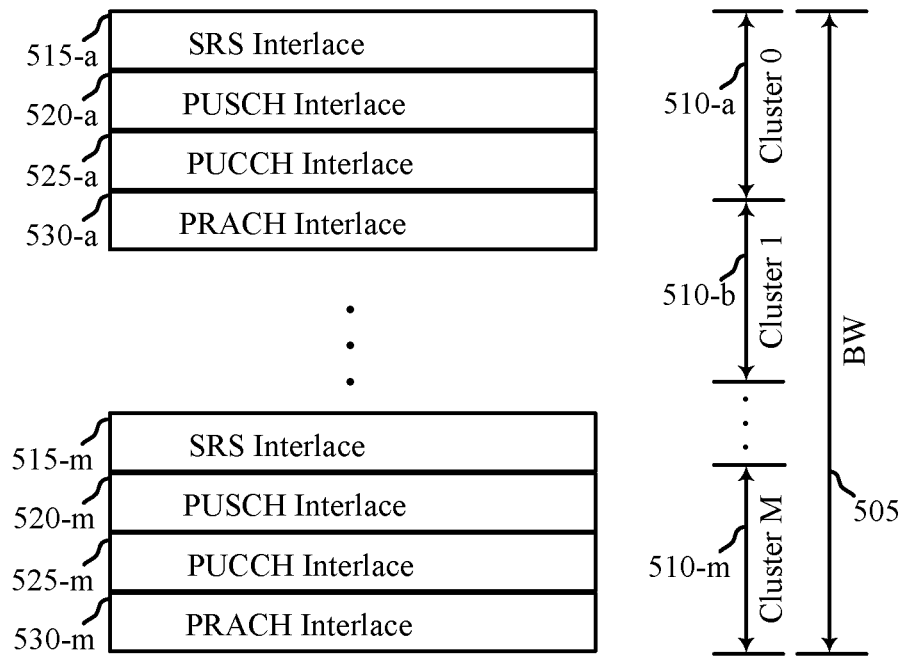
FIG. 5 illustrates an example of a interlace configuration that supports front loaded SRS and PRACH in accordance with aspects of the present disclosure.

FIG. 5 illustrates an example of an interlace configuration 500 that supports front loaded SRS and PRACH in accordance with aspects of the present disclosure. In some examples, interlace configuration 500 may implement aspects of wireless communication system 100 and/or TDD frame configuration 200. Aspects of interlace configuration 500 may be implemented by a UE and/or a base station, which may be examples of the corresponding devices described herein.

Generally, the described techniques provide for a first device to capture the channel of a shared or unlicensed radio frequency spectrum band for a TDD frame. For example, the first device (e.g., base station) may perform a CCA procedure on the channel and, if successful, capture the channel for the TDD frame. The first device may perform downlink transmission(s) on the channel and/or use the channel for uplink transmissions from a second device (e.g., a UE). In some aspects, the channel may have an associated bandwidth 505 that includes a plurality of clusters 510 (with clusters 510-*a* through 510-*m* being shown by way of example only). Generally, each cluster 510 may support an interlace-based design where different types of transmissions are multiplexed in the frequency domain (e.g., on different interlaces). For example, a first cluster 510-*a* may include an SRS interlace 515-*a*, a PUSCH interlace 520-*a*, and a PUCCH interlace 525-*a*. The second cluster 510-*b* may begin with a PRACH interlace 530-*a* and continue with one or more additional interlaces (not shown). The final cluster 510-*m* may include a PUSCH interlace 520-*m*, a PUCCH interlace 525-*m*, and a PRACH interlace 530-*m*. Other cluster 510 configurations may also be used.

Accordingly, the second device may transmit the SRS (or PRACH preamble) in the SRS interlace 515-*a* (e.g., a first interlace) of the channel bandwidth 505 and the DMRS, or uplink control or data transmission, or random access transmissions in corresponding PUSCH interlace 520-*a*, PUCCH interlace 525-*a*, PRACH interlace 530-*a* (e.g., a second interlace) of the channel bandwidth 505.

Figure 6:
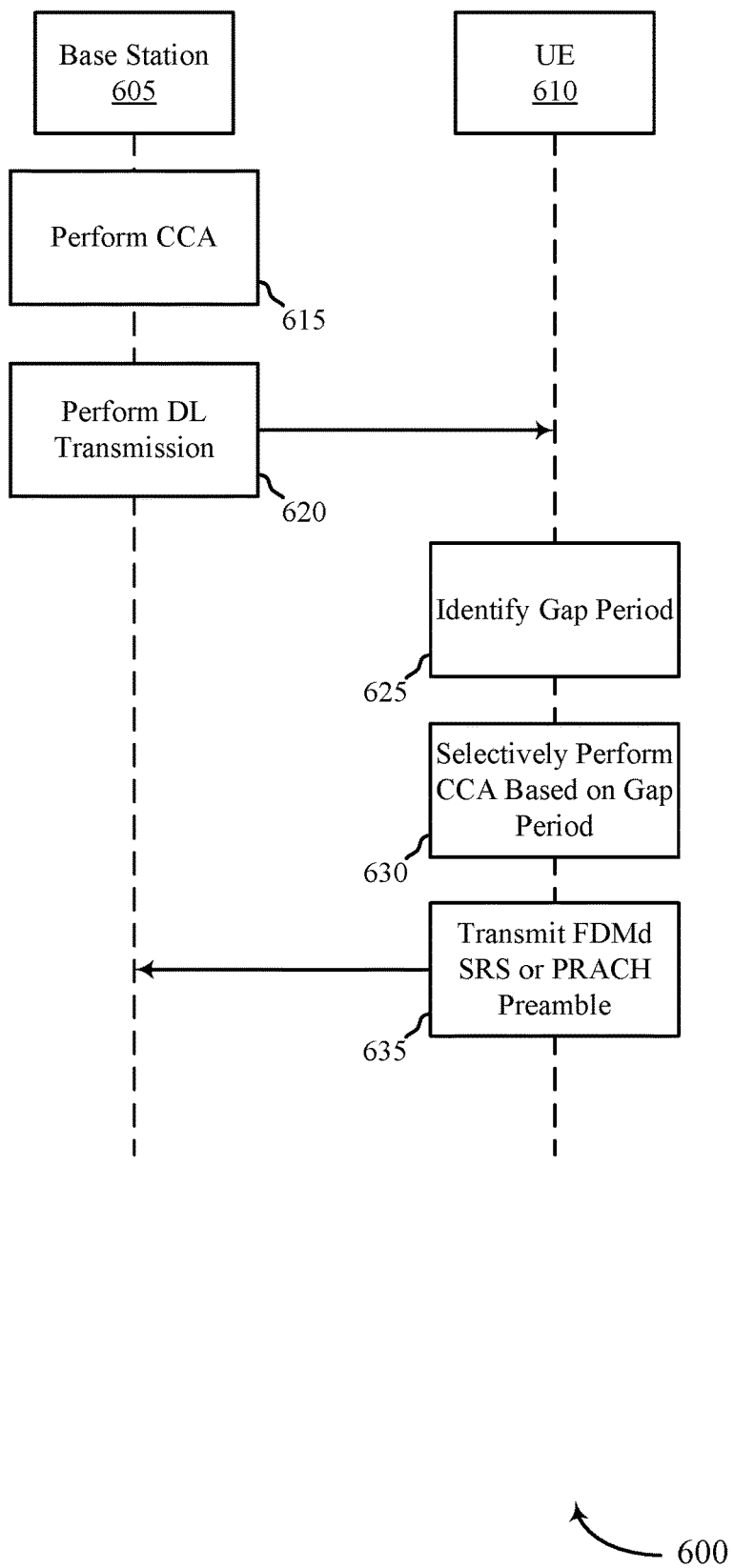
FIG. 6 illustrates an example of a process that supports front loaded SRS and PRACH in accordance with aspects of the present disclosure.

FIG. 6 illustrates an example of a process 600 that supports front loaded SRS and PRACH in accordance with aspects of the present disclosure. In some examples, process 600 may implement aspects of wireless communication system 100, TDD frame configuration 200, RB configurations 300/400, and/or interlace configuration 500. Process 600 may include a base station 605 and a UE 610, which may be examples of the corresponding devices described herein. In some aspects, base station 605 may refer to a first device and UE 610 may refer to a second device, or vice versa.

At 615, base station 605 may perform a CCA procedure on a channel of a radio frequency spectrum band. The CCA procedure (or other LBT procedure) may be performed prior to a downlink portion of the TDD frame.

At 620, base station 605 may transmit (and UE 610 may receive) a downlink transmission during a downlink portion of the TDD frame. In some aspects, base station 605 may transmit the downlink transmission based on the CCA procedure being successful, e.g., based on whether or not base station 605 captures the channel.

At 625, UE 610 may identify a gap period following the downlink portion of the TDD frame. Broadly, the gap period may refer to the time period between the downlink portion and an uplink portion of the TDD frame.

At 630, UE 610 may selectively perform a CCA procedure on the channel. For example, UE 610 may perform the CCA procedure when the duration of the gap period exceeds a threshold. As another example, UE 610 may transmit the SRS or PRACH preamble without performing a CCA procedure when the duration of the gap period is less than a threshold.

At 635, UE 610 may transmit (and base station 605 may receive) an uplink transmission. In some aspects, the uplink transmission may include an SRS and/or a PRACH preamble transmitted in a set of initial symbols of the uplink portion of the TDD frame, e.g., the first one or more symbols following gap period. In some aspects, the SRS and/or PRACH preamble may be multiplexed in the frequency domain during the set of initial symbols with a DMRS, uplink control or data transmission(s), and/or a random access transmission(s).

In some aspects, this may include UE 610 identifying a first comb of a resource block and transmitting the SRS and/or PRACH preamble on the first comb. UE 610 may identify a second comb and transmit the DMRS, uplink control or data transmission(s), and/or a random access transmission(s) on the second comb.

In some aspects, the DMRS may be transmitted from one or more antenna ports. For example, the DMRS may be transmitted on a first set of antenna ports during a first subset of the set of initial symbols and transmitted from a second set of antenna ports during a second subset of the set of initial symbols.

In some aspects, this may include UE 610 transmitting the SRS or PRACH preamble multiplexed in the frequency domain with an uplink data transmission during a first subset of the set of initial symbols.

In some aspects, this may include UE 610 transmitting the SRS or PRACH preamble frequency domain multiplexed with the DMRS, uplink control or data transmission(s), and/or a random access transmission(s) on different interlaces of the channel bandwidth.

Figure 7:
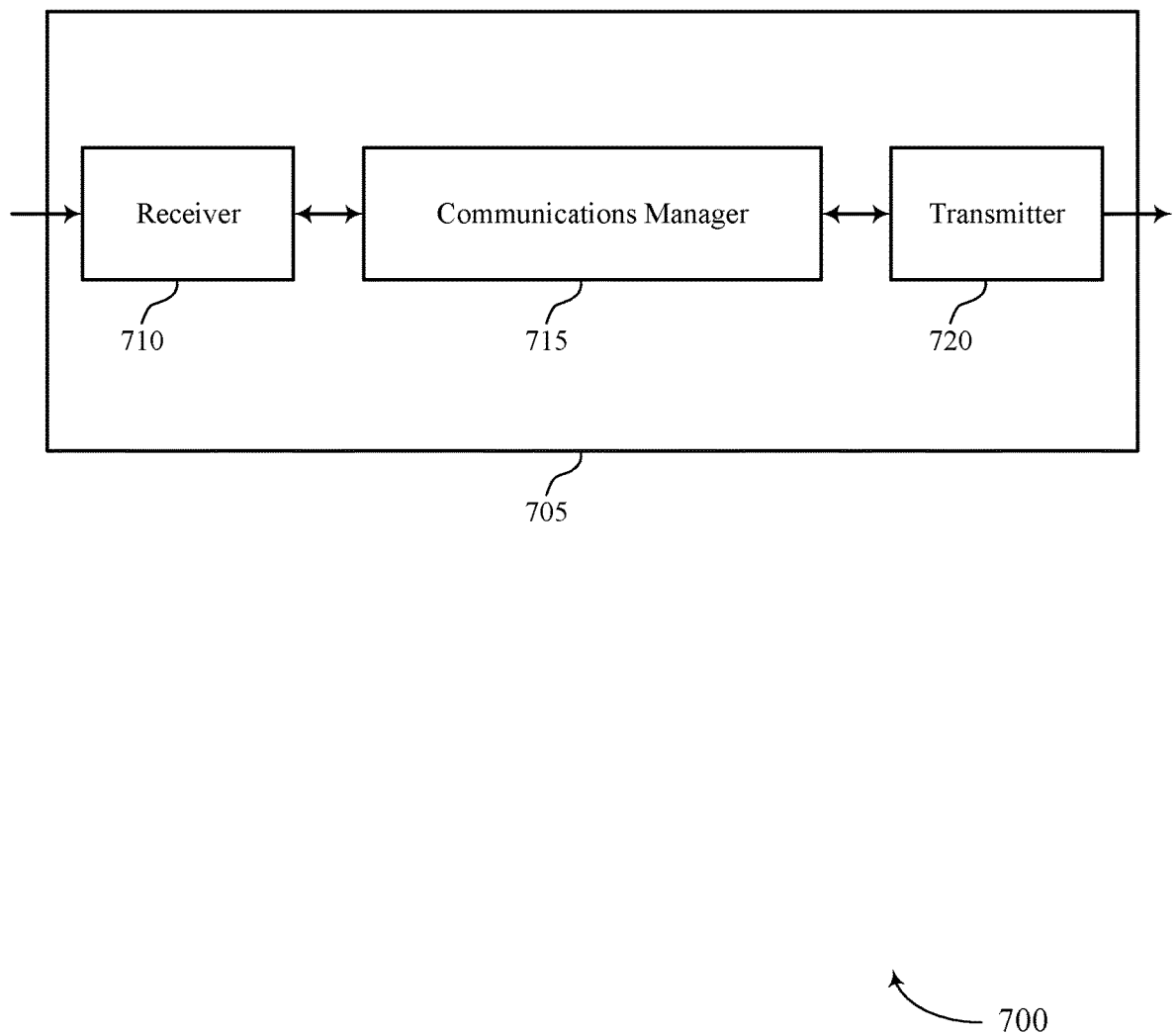
FIGS. 7 and 8 show block diagrams of devices that support front loaded SRS and PRACH in accordance with aspects of the present disclosure.

FIG. 7 shows a block diagram 700 of a device 705 that supports front loaded SRS and PRACH in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to front loaded SRS, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a gap period following a downlink portion of a TDD frame, selectively perform, based on the gap period, a CCA on a channel of a radio frequency spectrum band, and transmit at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission. The actions performed by the communications manager 715 as described herein may be implemented to realize one or more potential advantages. One implementation may allow a UE 115 to reduce latency and conserve resources by avoiding additional lengthy CCA procedures by minimizing the gap period between downlink and uplink portions of the TDD frame. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
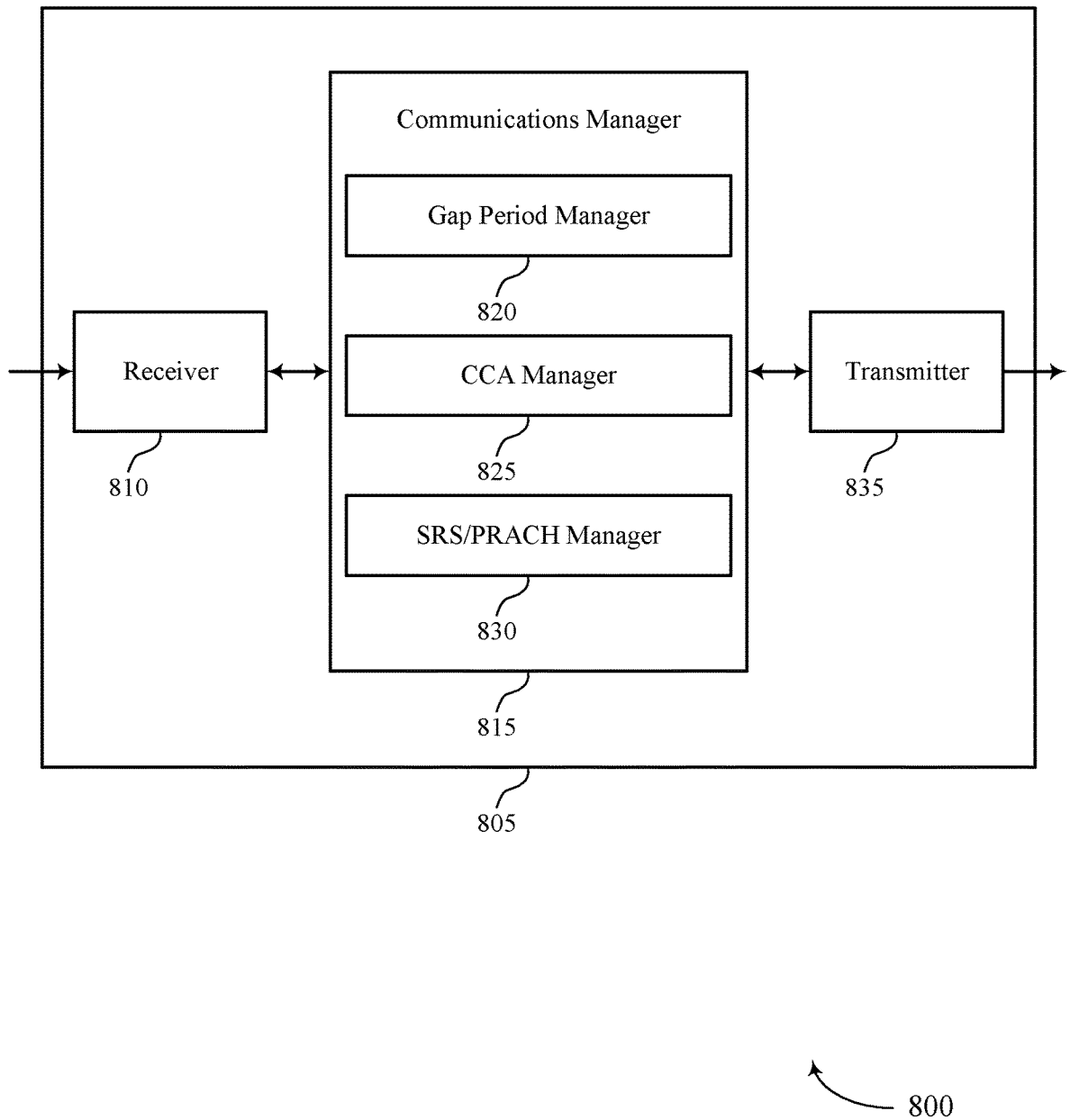

FIG. 8 shows a block diagram 800 of a device 805 that supports front loaded SRS and PRACH in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to front loaded SRS, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a gap period manager 820, a CCA manager 825, and a SRS/PRACH manager 830. The communications manager 815 may be an example of aspects of the communications manager 1010 described herein.

The gap period manager 820 may identify a gap period following a downlink portion of a TDD frame.

The CCA manager 825 may selectively perform, based on the gap period, a CCA on a channel of a radio frequency spectrum band.

The SRS/PRACH manager 830 may transmit at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
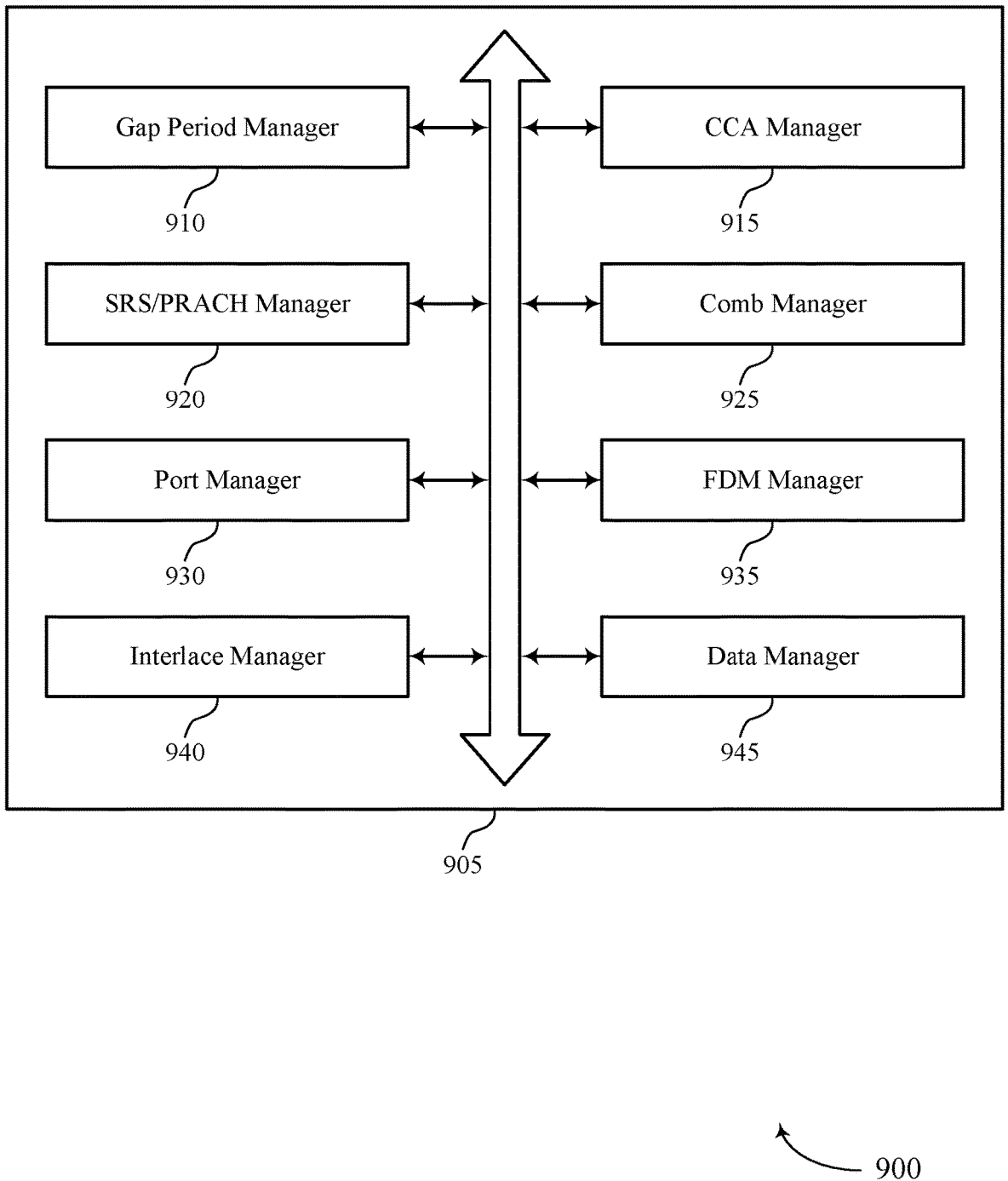
FIG. 9 shows a block diagram of a communications manager that supports front loaded SRS and PRACH in accordance with aspects of the present disclosure.

FIG. 9 shows a block diagram 900 of a communications manager 905 that supports front loaded SRS and PRACH in accordance with aspects of the present disclosure. The communications manager 905 may be an example of aspects of a communications manager 715, a communications manager 815, or a communications manager 1010 described herein. The communications manager 905 may include a gap period manager 910, a CCA manager 915, a SRS/PRACH manager 920, a comb manager 925, a port manager 930, a FDM manager 935, an interlace manager 940, and a data manager 945. Each of these modules may communicate, directly or indirectly, with one another (e.g., via one or more buses).

The gap period manager 910 may identify a gap period following a downlink portion of a TDD frame.

The CCA manager 915 may selectively perform, based on the gap period, a CCA on a channel of a radio frequency spectrum band. In some examples, the CCA manager 915 may perform the CCA procedure when a duration of the gap period exceeds a threshold. In some examples, the CCA manager 915 may transmit the SRS or PRACH preamble without performing the CCA procedure when a duration of the gap period is less than a threshold.

The SRS/PRACH manager 920 may transmit at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission. In some cases, the set of initial symbols include one or more symbols immediately following the gap period.

The comb manager 925 may identify a first comb of a resource block, where the SRS or PRACH preamble is transmitted on the first comb of the resource block during the set of initial symbols. In some cases, the DMRS, or the uplink data transmission, or the uplink control transmission, or the random access transmission are transmitted on a second comb of the resource block.

The port manager 930 may transmit the DMRS from a first set of antenna ports during a first subset of the set of initial symbols. In some examples, the port manager 930 may transmit the DMRS from a second set of antenna ports during a second subset of the set of initial symbols.

The FDM manager 935 may transmit the SRS or PRACH preamble frequency-domain multiplexed with the uplink data transmission during a first subset of the set of initial symbols. In some examples, the FDM manager 935 may transmit the SRS or PRACH preamble frequency-domain multiplexed with the DMRS from a set of antenna ports during a second subset of the set of initial symbols. In some cases, the SRS or PRACH preamble and the DMRS are transmitted on different combs of a resource block.

The interlace manager 940 may transmit the SRS or PRACH preamble on a first interlace of a channel bandwidth and the DMRS, or uplink data transmission, or uplink control transmission, or random access transmission on a second interlace of the channel bandwidth.

The data manager 945 may transmit the uplink data transmission over a PUSCH. In some examples, the data manager 945 may transmit an additional uplink data transmission over a PUSCH during one or more symbols occurring after the set of initial symbols.

Figure 10:
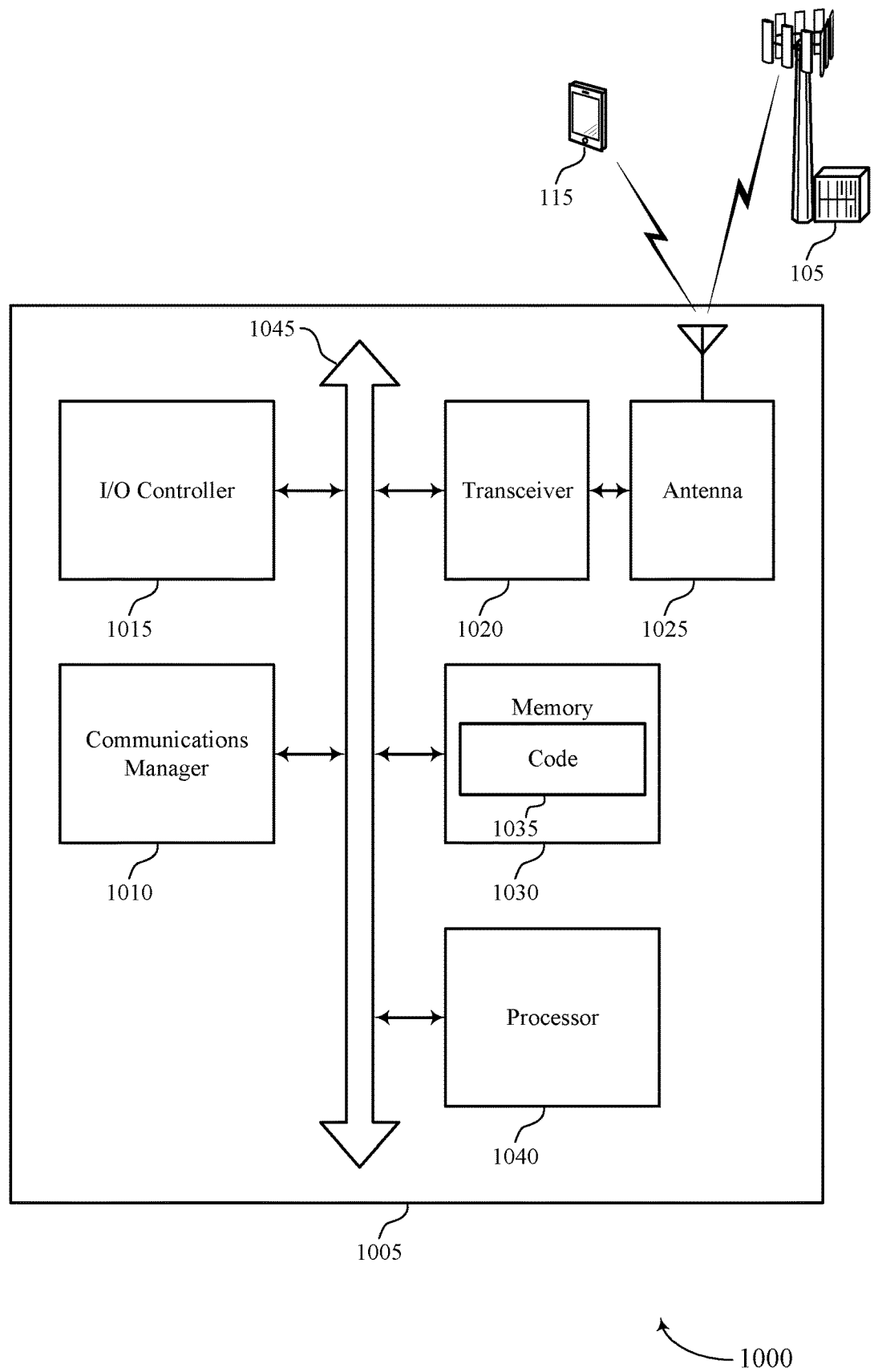
FIG. 10 shows a diagram of a system including a device that supports front loaded SRS and PRACH in accordance with aspects of the present disclosure.

FIG. 10 shows a diagram of a system 1000 including a device 1005 that supports front loaded SRS and PRACH in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a gap period following a downlink portion of a TDD frame, selectively perform, based on the gap period, a CCA on a channel of a radio frequency spectrum band, and transmit at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases, the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting front loaded SRS).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
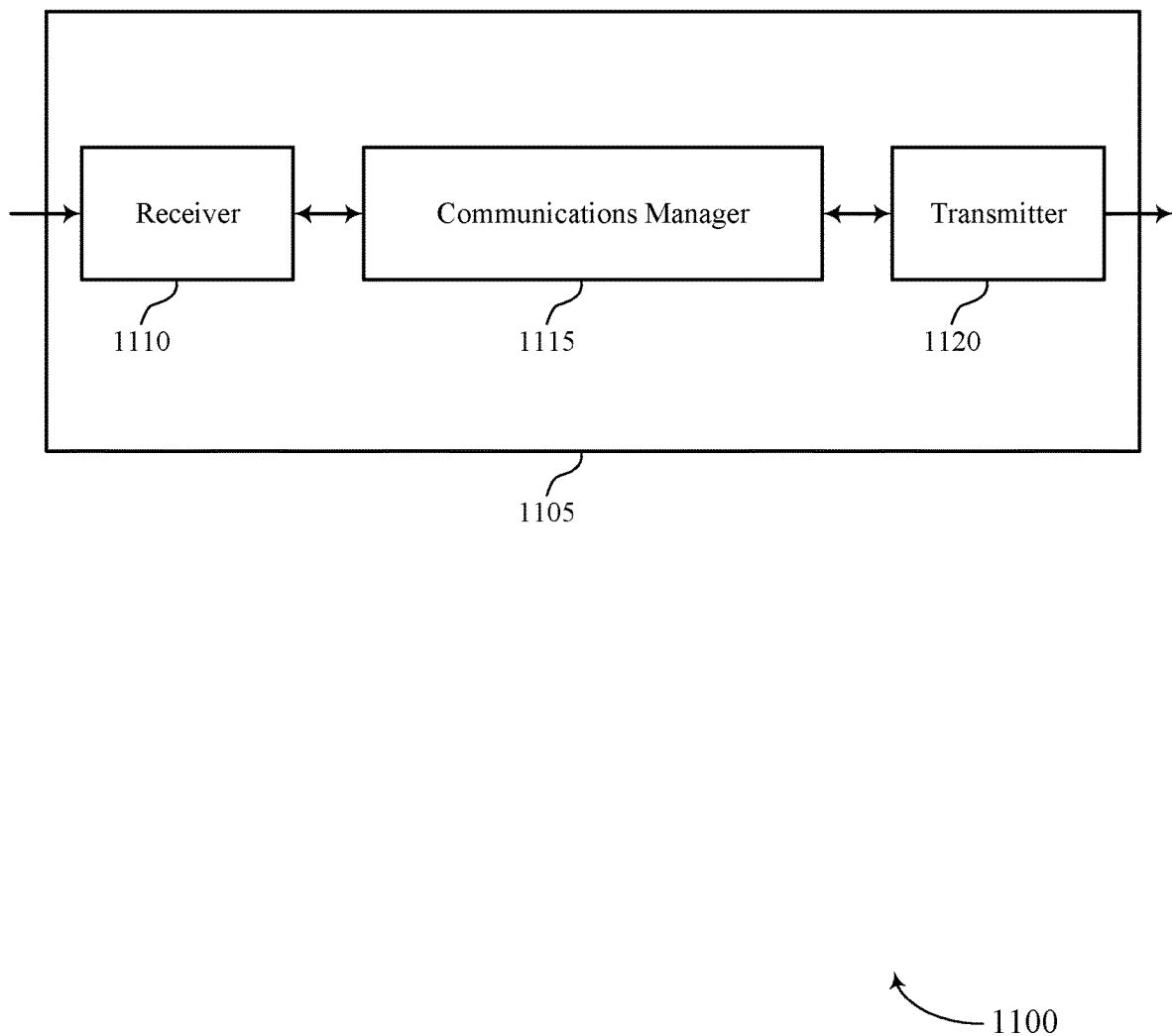
FIGS. 11 and 12 show block diagrams of devices that support front loaded SRS and PRACH in accordance with aspects of the present disclosure.

FIG. 11 shows a block diagram 1100 of a device 1105 that supports front loaded SRS and PRACH in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to front loaded SRS, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may perform a CCA on a channel of a radio frequency spectrum band prior to a downlink portion of a TDD frame, perform, based on a success of the CCA, a downlink transmission during the downlink portion of the TDD frame, and receive, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
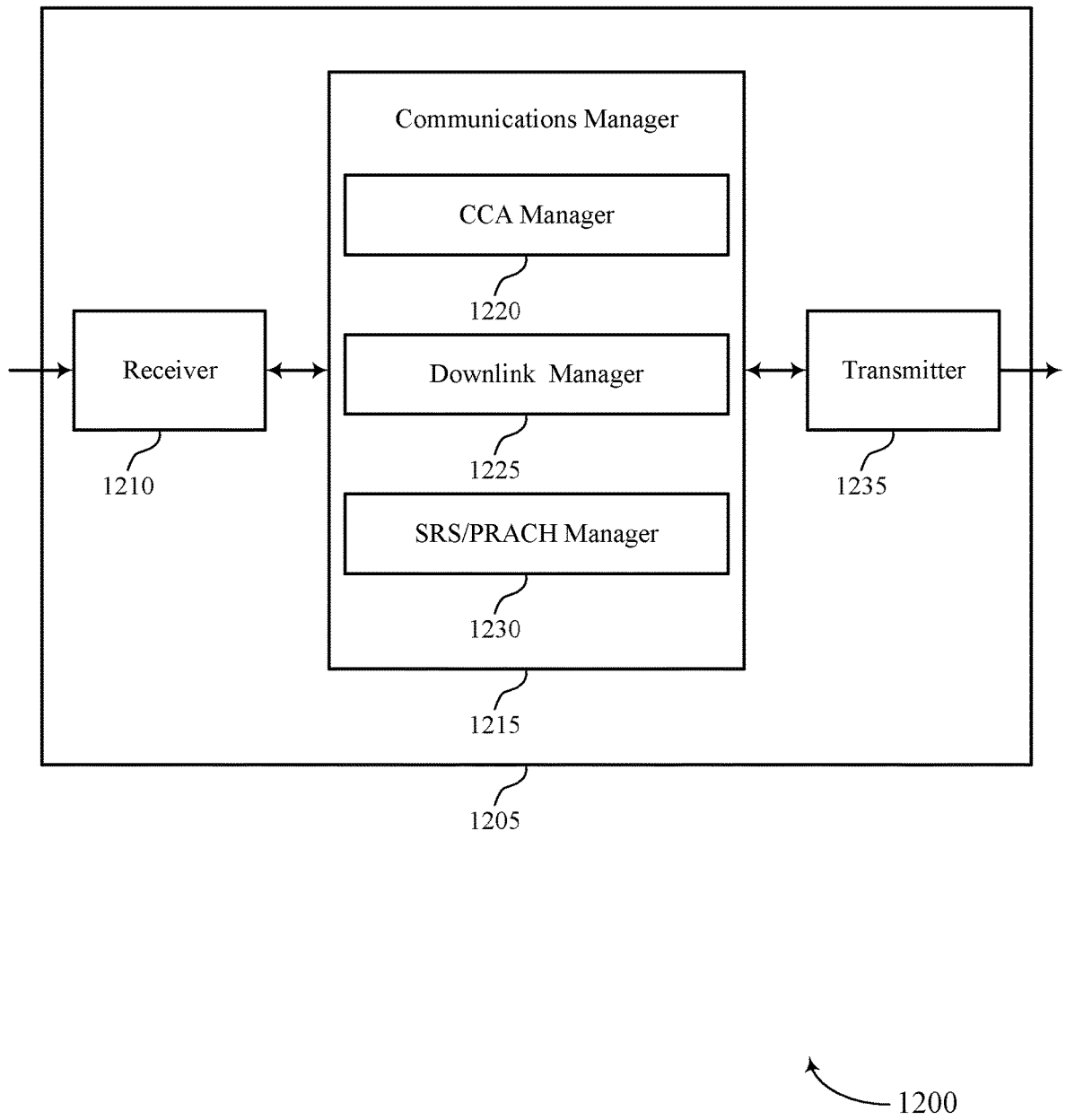

FIG. 12 shows a block diagram 1200 of a device 1205 that supports front loaded SRS and PRACH in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to front loaded SRS, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a CCA manager 1220, a downlink manager 1225, and a SRS/PRACH manager 1230. The communications manager 1215 may be an example of aspects of the communications manager 1410 described herein.

The CCA manager 1220 may perform a CCA on a channel of a radio frequency spectrum band prior to a downlink portion of a TDD frame.

The downlink manager 1225 may perform, based on a success of the CCA, a downlink transmission during the downlink portion of the TDD frame.

The SRS/PRACH manager 1230 may receive, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
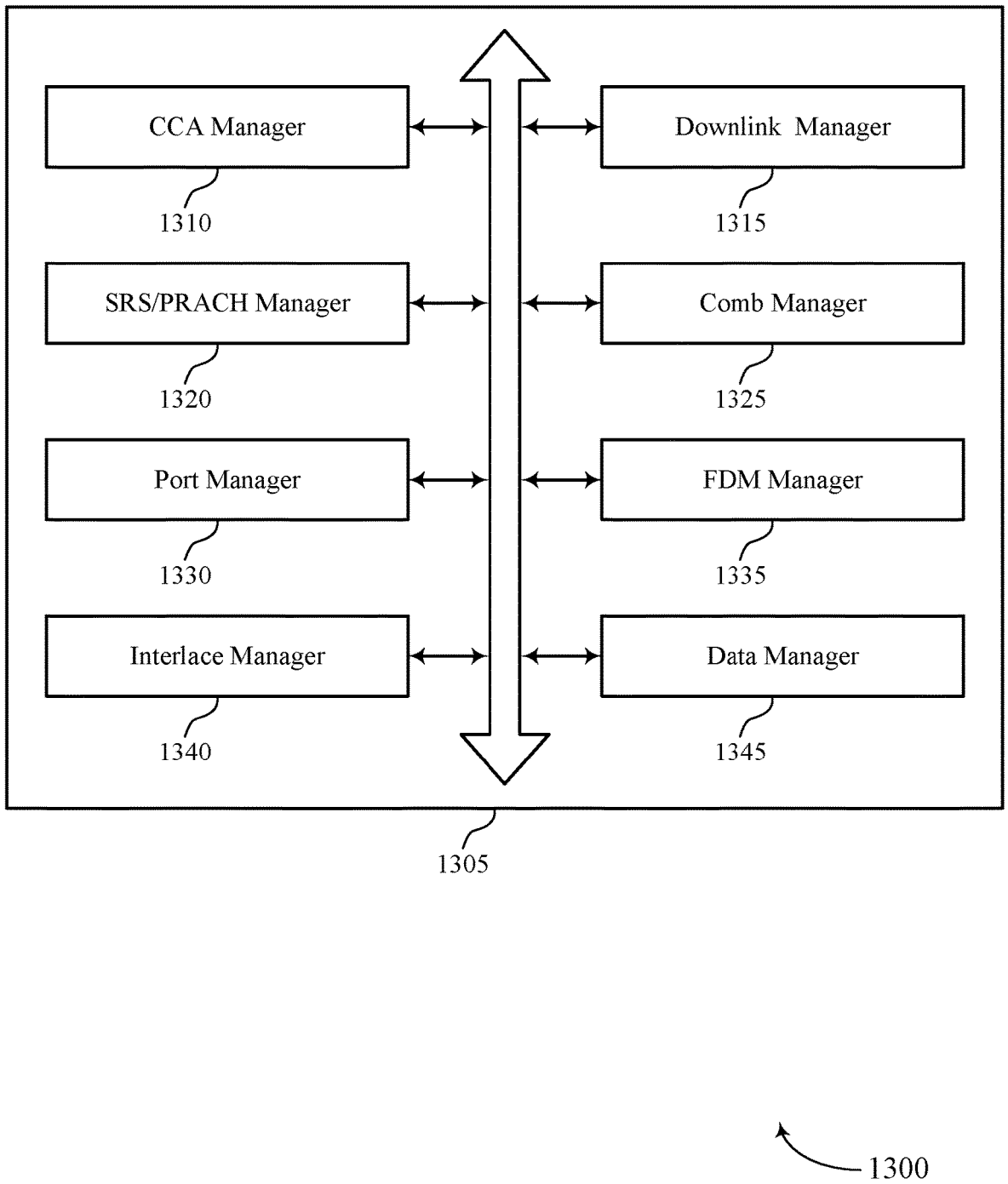
FIG. 13 shows a block diagram of a communications manager that supports front loaded SRS and PRACH in accordance with aspects of the present disclosure.

FIG. 13 shows a block diagram 1300 of a communications manager 1305 that supports front loaded SRS and PRACH in accordance with aspects of the present disclosure. The communications manager 1305 may be an example of aspects of a communications manager 1115, a communications manager 1215, or a communications manager 1410 described herein. The communications manager 1305 may include a CCA manager 1310, a downlink manager 1315, a SRS/PRACH manager 1320, a comb manager 1325, a port manager 1330, a FDM manager 1335, an interlace manager 1340, and a data manager 1345. Each of these modules may communicate, directly or indirectly, with one another (e.g., via one or more buses).

The CCA manager 1310 may perform a CCA on a channel of a radio frequency spectrum band prior to a downlink portion of a TDD frame.

The downlink manager 1315 may perform, based on a success of the CCA, a downlink transmission during the downlink portion of the TDD frame.

The SRS/PRACH manager 1320 may receive, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission. In some examples, the SRS/PRACH manager 1320 may receive the SRS or PRACH preamble from a first device and the DMRS, or uplink data transmission, or uplink control transmission, or random access transmission from a second device, the second device being different from the first device. In some examples, the SRS/PRACH manager 1320 may receive the SRS or PRACH preamble and at least one of the DMRS, or uplink data transmission, or uplink control transmission, or random access transmission from a same device. In some cases, the set of initial symbols include one or more symbols immediately following the gap period.

The comb manager 1325 may identify a first comb of a resource block, where the SRS or PRACH preamble is received on the first comb of the resource block during the set of initial symbols. In some examples, the comb manager 1325 may identify a second comb of the resource block. In some examples, the comb manager 1325 may receive one or more of: the DMRS, or the uplink data transmission, or the uplink control transmission, or the random access transmission on the second comb of the resource block.

The port manager 1330 may receive the DMRS from a first set of antenna ports during a first subset of the set of initial symbols. In some examples, the port manager 1330 may receive the DMRS from a second set of antenna ports during a second subset of the set of initial symbols.

The FDM manager 1335 may receive the SRS or PRACH preamble frequency-domain multiplexed with the uplink data transmission during a first subset of the set of initial symbols. In some examples, the FDM manager 1335 may receive the SRS or PRACH preamble frequency-domain multiplexed with the DMRS from a set of antenna ports during a second subset of the set of initial symbols. In some cases, the SRS or PRACH preamble and the DMRS are received on a different comb of a resource block.

The interlace manager 1340 may receive the SRS or PRACH preamble on a first interlace of a channel bandwidth and the DMRS, or uplink data transmission, or uplink control transmission, or random access transmission on a second interlace of the channel bandwidth.

The data manager 1345 may receive the uplink data transmission over a PUSCH. In some examples, the data manager 1345 may receive an additional uplink data transmission over a PUSCH during one or more symbols occurring after the set of initial symbols.

Figure 14:
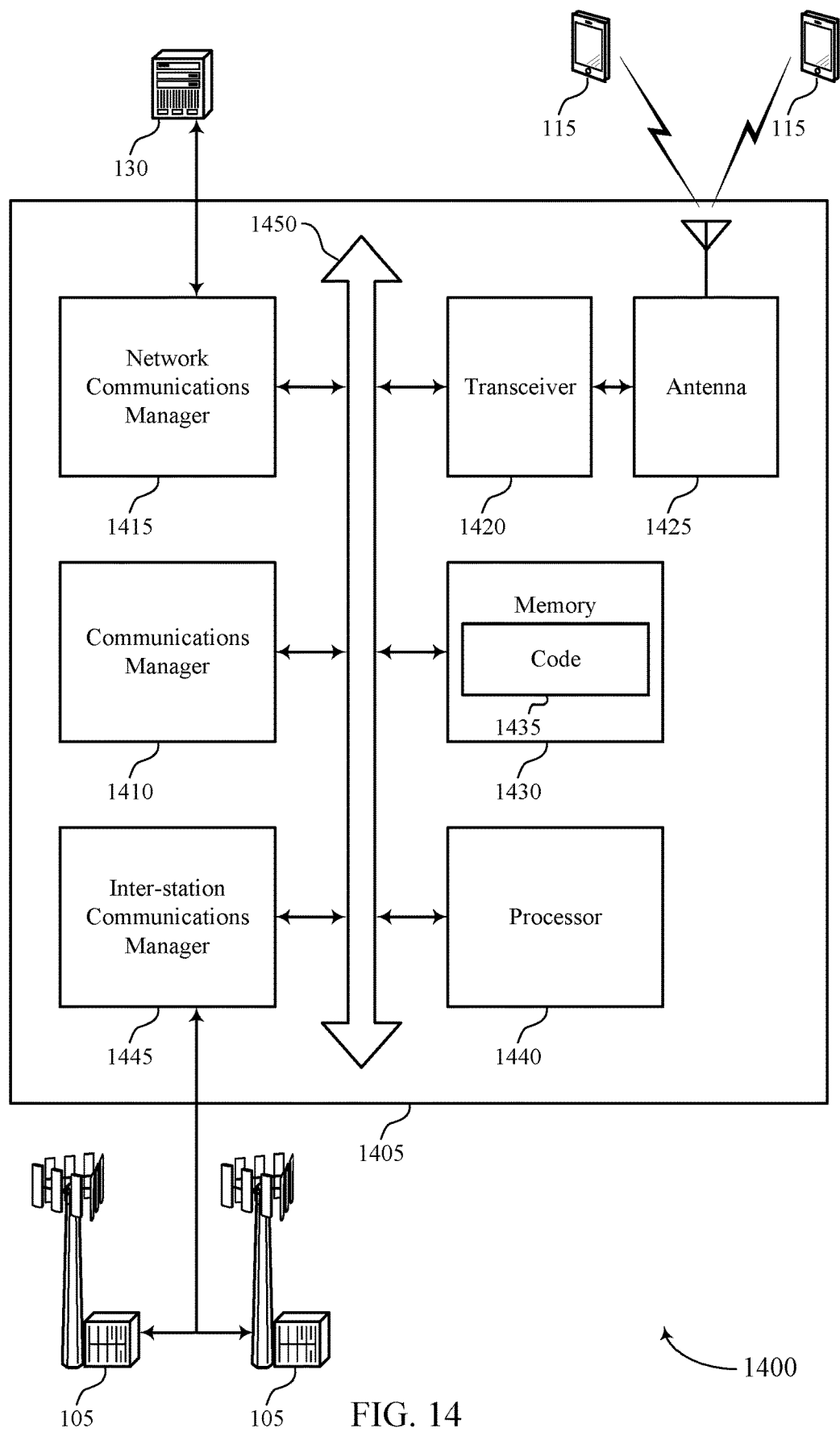
FIG. 14 shows a diagram of a system including a device that supports front loaded SRS and PRACH in accordance with aspects of the present disclosure.

FIG. 14 shows a diagram of a system 1400 including a device 1405 that supports front loaded SRS and PRACH in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may perform a CCA on a channel of a radio frequency spectrum band prior to a downlink portion of a TDD frame, perform, based on a success of the CCA, a downlink transmission during the downlink portion of the TDD frame, and receive, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a demodulation reference signal (DMRS), an uplink data transmission, an uplink control transmission, or a random access transmission.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases, the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting front loaded SRS).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
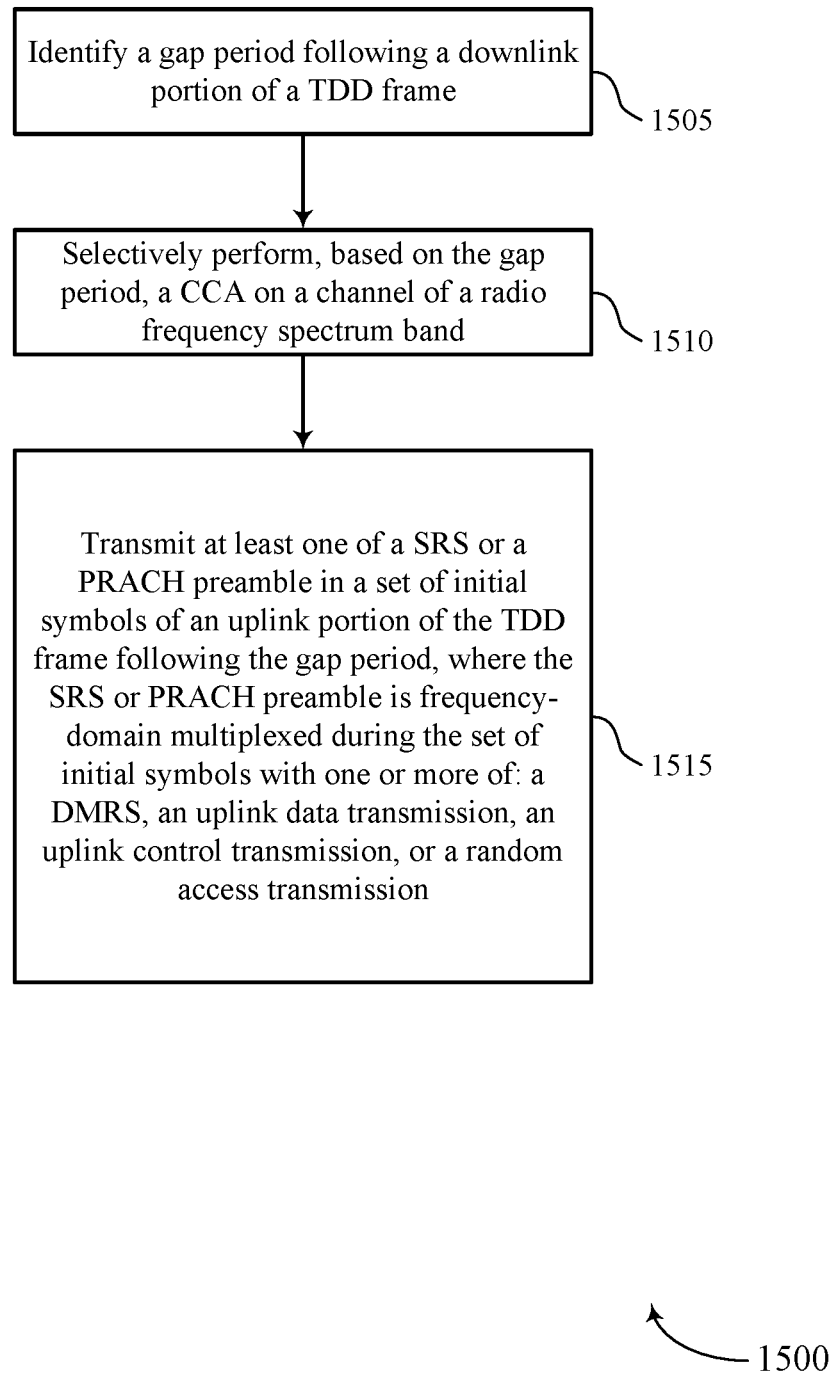
FIGS. 15 through 18 show flowcharts illustrating methods that support front loaded SRS and PRACH in accordance with aspects of the present disclosure.

FIG. 15 shows a flowchart illustrating a method 1500 that supports front loaded SRS and PRACH in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may identify a gap period following a downlink portion of a TDD frame. The operations of 1505 may be performed according to the methods described herein. In some examples, aspects of the operations of 1505 may be performed by a gap period manager as described with reference to FIGS. 7 through 10.

At 1510, the UE may selectively perform, based on the gap period, a CCA on a channel of a radio frequency spectrum band. The operations of 1510 may be performed according to the methods described herein. In some examples, aspects of the operations of 1510 may be performed by a CCA manager as described with reference to FIGS. 7 through 10.

At 1515, the UE may transmit at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission. The operations of 1515 may be performed according to the methods described herein. In some examples, aspects of the operations of 1515 may be performed by a SRS/PRACH manager as described with reference to FIGS. 7 through 10.

Figure 16:
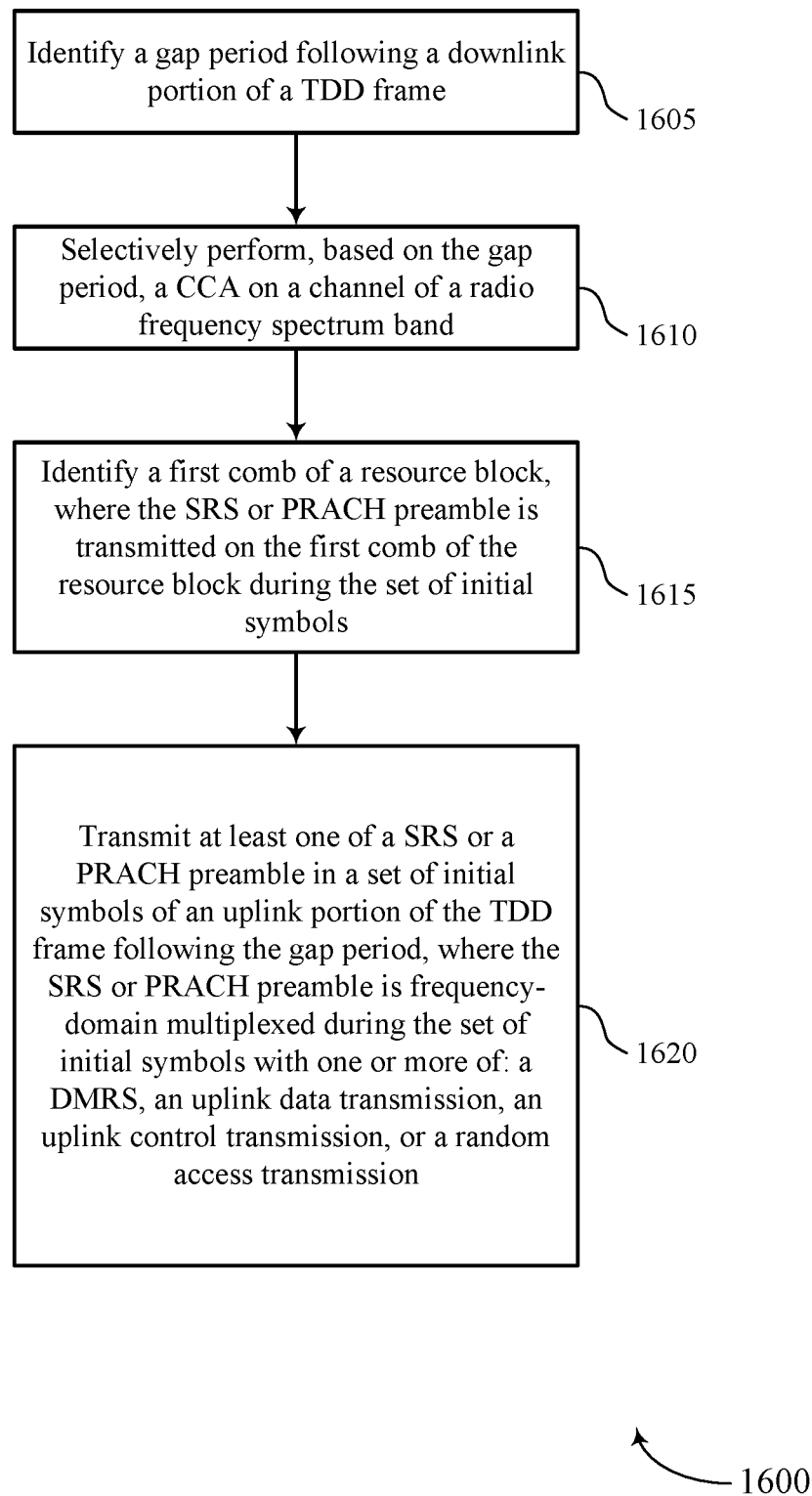

FIG. 16 shows a flowchart illustrating a method 1600 that supports front loaded SRS and PRACH in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may identify a gap period following a downlink portion of a TDD frame. The operations of 1605 may be performed according to the methods described herein. In some examples, aspects of the operations of 1605 may be performed by a gap period manager as described with reference to FIGS. 7 through 10.

At 1610, the UE may selectively perform, based on the gap period, a CCA on a channel of a radio frequency spectrum band. The operations of 1610 may be performed according to the methods described herein. In some examples, aspects of the operations of 1610 may be performed by a CCA manager as described with reference to FIGS. 7 through 10.

At 1615, the UE may identify a first comb of a resource block, where the SRS or PRACH preamble is transmitted on the first comb of the resource block during the set of initial symbols. The operations of 1615 may be performed according to the methods described herein. In some examples, aspects of the operations of 1615 may be performed by a comb manager as described with reference to FIGS. 7 through 10.

At 1620, the UE may transmit at least one of a SRS or a PRACH preamble in a set of initial symbols of an uplink portion of the TDD frame following the gap period, where the SRS or PRACH preamble is frequency-domain multiplexed during the set of initial symbols with one or more of: a DMRS, an uplink data transmission, an uplink control transmission, or a random access transmission. The operations of 1620 may be performed according to the methods described herein. In some examples, aspects of the operations of 1620 may be performed by a SRS/PRACH manager as described with reference to FIGS. 7 through 10.

Figure 17:
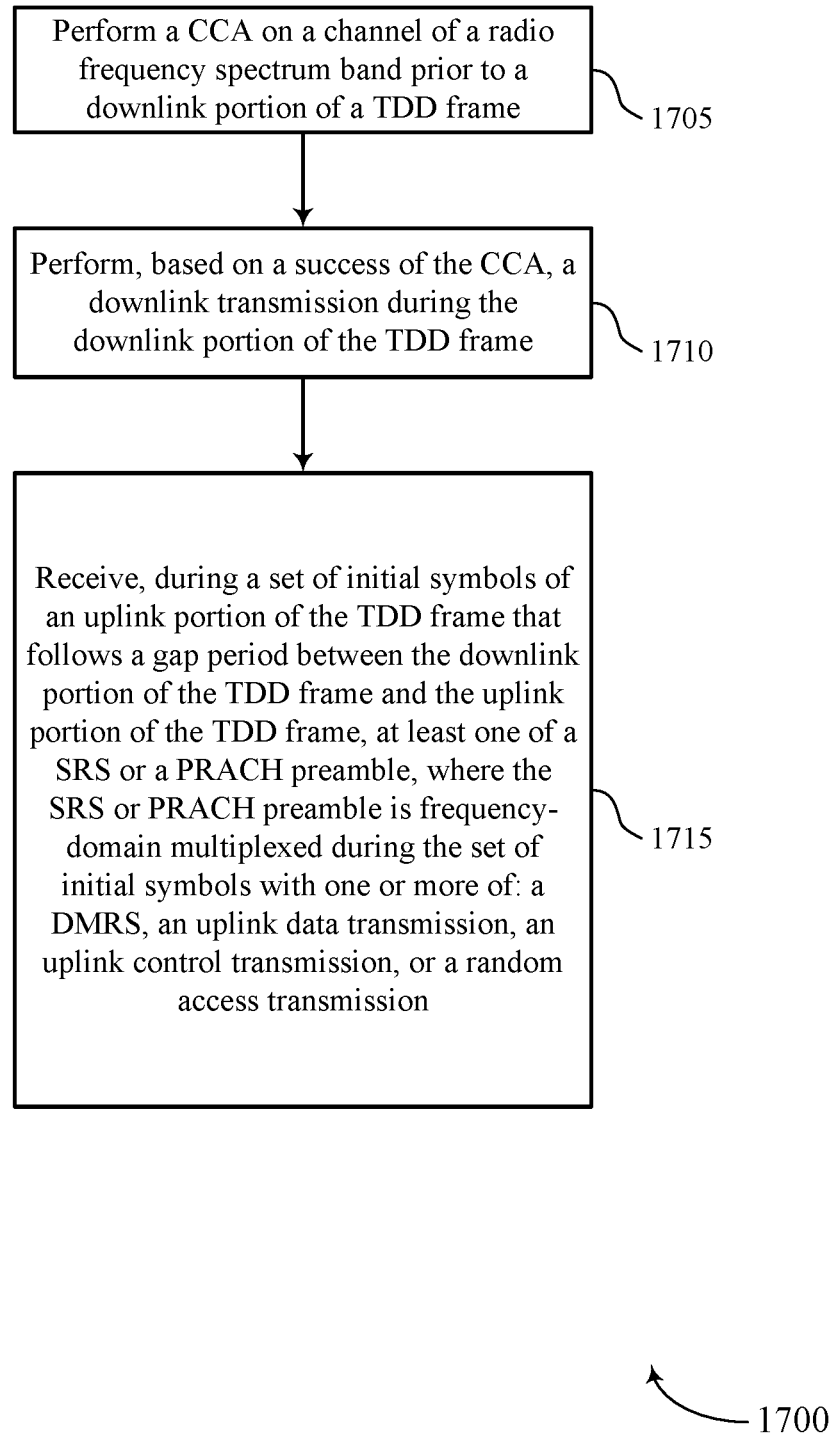

FIG. 17 shows a flowchart illustrating a method 1700 that supports front loaded SRS and PRACH in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may perform a CCA on a channel of a radio frequency spectrum band prior to a downlink portion of a TDD frame. The operations of 1705 may be performed according to the methods described herein. In some examples, aspects of the operations of 1705 may be performed by a CCA manager as described with reference to FIGS. 11 through 14.

At 1710, the base station may perform, based on a success of the CCA, a downlink transmission during the downlink portion of the TDD frame. The operations of 1710 may be performed according to the methods described herein. In some examples, aspects of the operations of 1710 may be performed by a downlink manager as described with reference to FIGS. 11 through 14.

At 1715, the base station may receive, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission. The operations of 1715 may be performed according to the methods described herein. In some examples, aspects of the operations of 1715 may be performed by a SRS/PRACH manager as described with reference to FIGS. 11 through 14.

Figure 18:
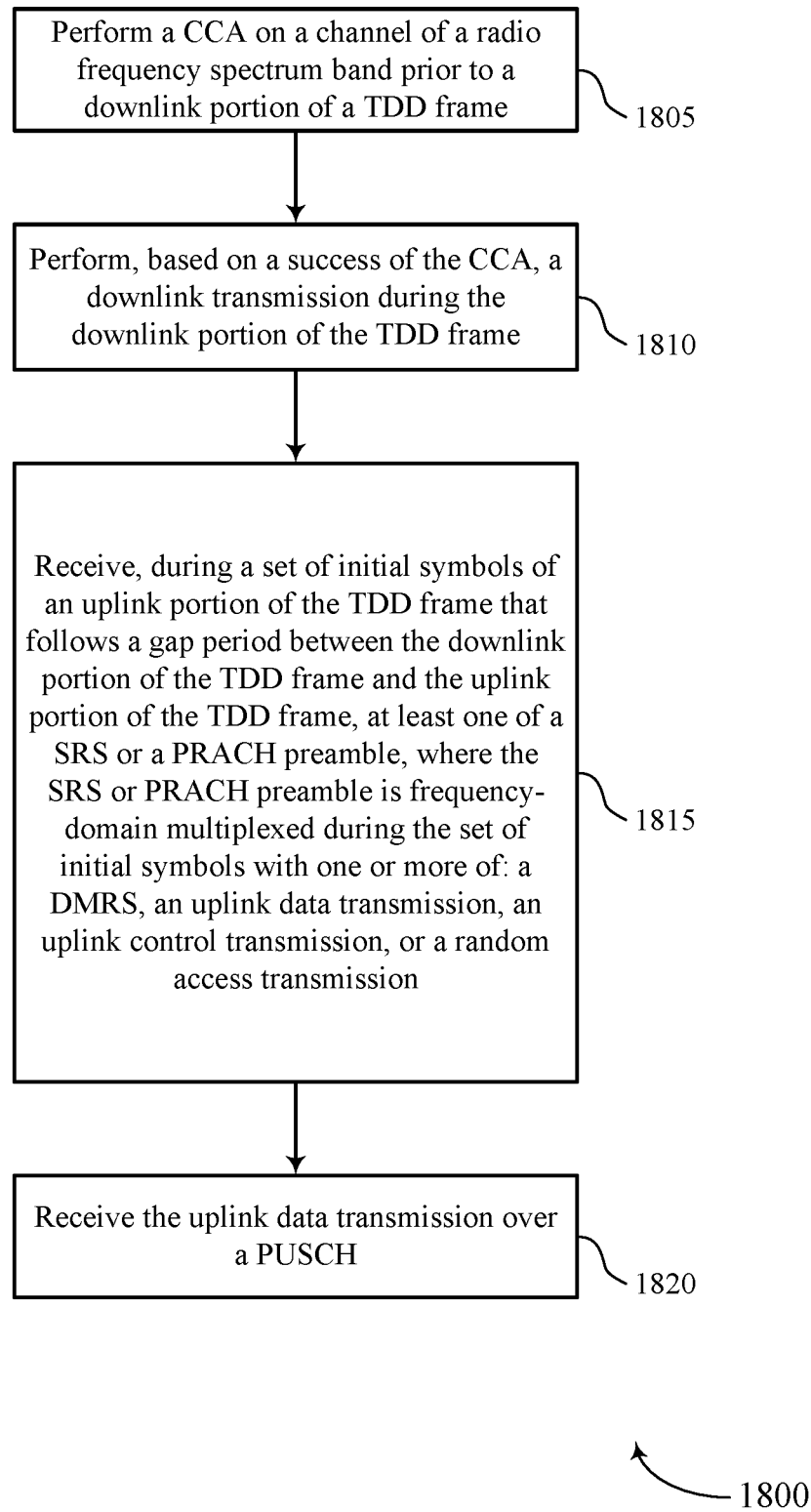

FIG. 18 shows a flowchart illustrating a method 1800 that supports front loaded SRS and PRACH in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may perform a CCA on a channel of a radio frequency spectrum band prior to a downlink portion of a TDD frame. The operations of 1805 may be performed according to the methods described herein. In some examples, aspects of the operations of 1805 may be performed by a CCA manager as described with reference to FIGS. 11 through 14.

At 1810, the base station may perform, based on a success of the CCA, a downlink transmission during the downlink portion of the TDD frame. The operations of 1810 may be performed according to the methods described herein. In some examples, aspects of the operations of 1810 may be performed by a downlink manager as described with reference to FIGS. 11 through 14.

At 1815, the base station may receive, during a set of initial symbols of an uplink portion of the TDD frame that follows a gap period between the downlink portion of the TDD frame and the uplink portion of the TDD frame, at least one of a SRS or a PRACH preamble, where the SRS or PRACH preamble is frequency-domain multiplexed during the set of initial symbols with one or more of: a DMRS, an uplink data transmission, an uplink control transmission, or a random access transmission. The operations of 1815 may be performed according to the methods described herein. In some examples, aspects of the operations of 1815 may be performed by a SRS/PRACH manager as described with reference to FIGS. 11 through 14.

At 1820, the base station may receive the uplink data transmission over a PUSCH. The operations of 1820 may be performed according to the methods described herein. In some examples, aspects of the operations of 1820 may be performed by a data manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
 identifying a gap period following a downlink portion of a time division duplexing (TDD) frame;

selectively performing, based at least in part on a comparison of the gap period with a threshold, a clear channel assessment (CCA) on a channel of a radio frequency spectrum band;

transmitting at least one of a sounding reference signal (SRS) or a physical random access channel (PRACH) preamble in a set of initial symbols of an uplink portion of the TDD frame following the gap period, wherein the SRS or PRACH preamble is frequency-domain multiplexed during the set of initial symbols with one or more of: a demodulation reference signal (DMRS), an uplink data transmission, an uplink control transmission, or a random access transmission;

transmitting the DMRS from a first set of antenna ports during a first subset of the set of initial symbols; and transmitting the DMRS from a second set of antenna ports during a second subset of the set of initial symbols.

2. The method of claim 1, wherein transmitting at least one of the SRS or the PRACH preamble is on a first comb of a resource block, the method further comprising:

identifying the first comb of the resource block.

3. The method of claim 1, wherein the PRACH preamble is frequency-domain multiplexed during the set of initial symbols with the uplink data transmission, the method further comprising:

transmitting the PRACH preamble frequency-domain multiplexed with the uplink data transmission during the first subset of the set of initial symbols.

4. The method of claim 3, further comprising:

transmitting the PRACH preamble frequency-domain multiplexed with the DMRS from the first set of antenna ports or the second set of antenna ports during the second subset of the set of initial symbols.

5. The method of claim 4, wherein the PRACH preamble and the DMRS are transmitted on different combs of a resource block.

6. The method of claim 1, further comprising:

transmitting the PRACH preamble on a first interlace of a channel bandwidth and the DMRS, or the uplink data transmission, or the uplink control transmission, or the random access transmission on a second interlace of the channel bandwidth.

7. The method of claim 1, wherein the PRACH preamble is frequency-domain multiplexed during the set of initial symbols with an uplink data transmission, the method further comprising:

transmitting an additional uplink data transmission over a physical uplink shared channel (PUSCH) during one or more symbols occurring after the set of initial symbols.

8. The method of claim 1, wherein selectively performing the CCA on the channel of the radio frequency spectrum band based at least in part on the gap period comprises:

performing a CCA procedure when a duration of the gap period exceeds the threshold.

9. The method of claim 1, wherein selectively performing the CCA on the channel of the radio frequency spectrum band based at least in part on the gap period comprises:

transmitting the PRACH preamble without performing a CCA procedure when a duration of the gap period is less than the threshold.

10. The method of claim 1, wherein the set of initial symbols comprise one or more symbols immediately following the gap period.

11. An apparatus for wireless communication at a user equipment (UE), comprising:

a processor, memory coupled with the processor; and instructions stored in the memory and executable by the processor to cause the apparatus to:

identify a gap period following a downlink portion of a time division duplexing (TDD) frame;

selectively perform, based at least in part on a comparison of the gap period with a threshold, a clear channel assessment (CCA) on a channel of a radio frequency spectrum band;

transmit at least one of a sounding reference signal (SRS) or a physical random access channel (PRACH) preamble in a set of initial symbols of an uplink portion of the TDD frame following the gap period, wherein the SRS or PRACH preamble is frequency-domain multiplexed during the set of initial symbols with one or more of: a demodulation reference signal (DMRS), an uplink data transmission, an uplink control transmission, or a random access transmission;

transmit the DMRS from a first set of antenna ports during a first subset of the set of initial symbols; and transmit the DMRS from a second set of antenna ports during a second subset of the set of initial symbols.

12. The apparatus of claim 11, wherein the instructions to transmit the at least one of the SRS or the PRACH preamble is on a first comb of a resource block are further executable by the processor to cause the apparatus to:

identify the first comb of the resource block.

13. The apparatus of claim 11, wherein the PRACH preamble is frequency-domain multiplexed during the set of initial symbols with the uplink data transmission, and wherein the instructions are further executable by the processor to cause the apparatus to:

transmit the PRACH preamble frequency-domain multiplexed with the uplink data transmission during the first subset of the set of initial symbols.

14. The apparatus of claim 13, wherein the instructions are further executable by the processor to cause the apparatus to:

transmit the PRACH preamble frequency-domain multiplexed with the DMRS from the first set of antenna ports or the second set of antenna ports during the second subset of the set of initial symbols.

15. The apparatus of claim 14, wherein the PRACH preamble and the DMRS are transmitted on different combs of a resource block.

16. The apparatus of claim 11, wherein the instructions are further executable by the processor to cause the apparatus to:

transmit the PRACH preamble on a first interlace of a channel bandwidth and the DMRS, or the uplink data transmission, or the uplink control transmission, or the random access transmission on a second interlace of the channel bandwidth.

17. The apparatus of claim 11, wherein the instructions are further executable by the processor to cause the apparatus to:

transmit an additional uplink data transmission over a physical uplink shared channel (PUSCH) during one or more symbols occurring after the set of initial symbols.

18. The apparatus of claim 11, wherein the instructions to selectively performing the CCA on the channel of the radio frequency spectrum band based at least in part on the gap period are executable by the processor to cause the apparatus to:

perform a CCA procedure when a duration of the gap period exceeds the threshold.

19. The apparatus of claim 11, wherein the instructions to selectively performing the CCA on the channel of the radio frequency spectrum band based at least in part on the gap period are executable by the processor to cause the apparatus to:
- transmit the PRACH preamble without performing a CCA procedure when a duration of the gap period is less than the threshold.

20. The apparatus of claim 11, wherein the set of initial symbols comprise one or more symbols immediately following the gap period.

21. An apparatus for wireless communication at a user equipment (UE), comprising:
- means for identifying a gap period following a downlink portion of a time division duplexing (TDD) frame;
- means for selectively performing, based at least in part on a comparison of the gap period with a threshold, a clear channel assessment (CCA) on a channel of a radio frequency spectrum band;
- means for transmitting at least one of a sounding reference signal (SRS) or a physical random access channel (PRACH) preamble in a set of initial symbols of an uplink portion of the TDD frame following the gap period, wherein the SRS or PRACH preamble is frequency-domain multiplexed during the set of initial symbols with one or more of: a demodulation reference signal (DMRS), an uplink data transmission, an uplink control transmission, or a random access transmission;
- means for transmitting the DMRS from a first set of antenna ports during a first subset of the set of initial symbols; and
- means for transmitting the DMRS from a second set of antenna ports during a second subset of the set of initial symbols.

22. The apparatus of claim 21, wherein the means for transmitting at least one of the SRS or the PRACH preamble is on a first comb of a resource block, the apparatus further comprising:
- means for identifying the first comb of the resource block.

23. The apparatus of claim 21, wherein the PRACH preamble is frequency-domain multiplexed during the set of initial symbols with the uplink data transmission, the apparatus further comprising:
- means for transmitting the PRACH preamble frequency-domain multiplexed with the uplink data transmission during the first subset of the set of initial symbols.

24. The apparatus of claim 23, further comprising:
- means for transmitting the PRACH preamble frequency-domain multiplexed with the DMRS from the first set of antenna ports or the second set of antenna ports during the second subset of the set of initial symbols.

25. The apparatus of claim 21, further comprising:
- means for transmitting the PRACH preamble on a first interlace of a channel bandwidth and the DMRS, or the uplink data transmission, or the uplink control transmission, or the random access transmission on a second interlace of the channel bandwidth.

26. A non-transitory computer-readable medium storing code for wireless communication at a user equipment (UE), the code comprising instructions executable by a processor to:
- identify a gap period following a downlink portion of a time division duplexing (TDD) frame;
- selectively perform, based at least in part on a comparison of the gap period with a threshold, a clear channel assessment (CCA) on a channel of a radio frequency spectrum band;
- transmit at least one of a sounding reference signal (SRS) or a physical random access channel (PRACH) preamble in a set of initial symbols of an uplink portion of the TDD frame following the gap period, wherein the SRS or PRACH preamble is frequency-domain multiplexed during the set of initial symbols with one or more of: a demodulation reference signal (DMRS), an uplink data transmission, an uplink control transmission, or a random access transmission;
- transmit the DMRS from a first set of antenna ports during a first subset of the set of initial symbols; and
- transmit the DMRS from a second set of antenna ports during a second subset of the set of initial symbols.

27. The non-transitory computer-readable medium of claim 26, wherein the code comprising instructions executable by the processor to transmit at least one of the SRS or the PRACH preamble is on a first comb of a resource block, the code further comprising instructions executable by the processor to:
- identify the first comb of the resource block.

28. The non-transitory computer-readable medium of claim 26, wherein the PRACH preamble is frequency-domain multiplexed during the set of initial symbols with the uplink data transmission, the code further comprising instructions executable by the processor to:
- transmit the PRACH preamble frequency-domain multiplexed with the uplink data transmission during the first subset of the set of initial symbols.

29. The non-transitory computer-readable medium of claim 28, the code further comprising instructions executable by the processor to:
- transmit the PRACH preamble frequency-domain multiplexed with the DMRS from the first set of antenna ports or the second set of antenna ports during the second subset of the set of initial symbols.

30. The non-transitory computer-readable medium of claim 26, the code further comprising instructions executable by the processor to:
- transmit the PRACH preamble on a first interlace of a channel bandwidth and the DMRS, or the uplink data transmission, or the uplink control transmission, or the random access transmission on a second interlace of the channel bandwidth.

* * * * *